US009753184B2

United States Patent
Sakurai et al.

(10) Patent No.: US 9,753,184 B2
(45) Date of Patent: Sep. 5, 2017

(54) WEATHER PREDICTING METHOD, WEATHER PREDICTING APPARATUS, AND AIR UTILIZING APPARATUS

(71) Applicant: JGC CORPORATION, Tokyo (JP)

(72) Inventors: Tatsuya Sakurai, Tokyo (JP); Shinsuke Satake, Tokyo (JP); Kenichiro Kado, Kanagawa (JP); Kei Kubota, Kanagawa (JP); Xidong Hu, Kanagawa (JP); Keita Yamamuro, Kanagawa (JP); Yuzuru Kakutani, Kanagawa (JP); Teru Asaka, Kanagawa (JP)

(73) Assignee: JGC CORPORATION, Tokyo (JP)

( * ) Notice: Subject to any disclaimer, the term of this patent is extended or adjusted under 35 U.S.C. 154(b) by 444 days.

(21) Appl. No.: 14/389,769

(22) PCT Filed: Jul. 28, 2013

(86) PCT No.: PCT/JP2013/070400
§ 371 (c)(1),
(2) Date: Oct. 1, 2014

(87) PCT Pub. No.: WO2014/021236
PCT Pub. Date: Feb. 6, 2014

(65) Prior Publication Data
US 2015/0066370 A1 Mar. 5, 2015

(30) Foreign Application Priority Data
Jul. 31, 2012 (JP) .................. 2012-170656

(51) Int. Cl.
G01W 1/02 (2006.01)
G01W 1/10 (2006.01)
F03D 17/00 (2016.01)

(52) U.S. Cl.
CPC ............. G01W 1/10 (2013.01); F03D 17/00 (2016.05); G01W 1/02 (2013.01); F05B 2260/8211 (2013.01)

(58) Field of Classification Search
CPC .................. G01W 1/02; F03D 17/00
See application file for complete search history.

(56) References Cited

U.S. PATENT DOCUMENTS

2009/0056413 A1   3/2009 Rao et al.
2013/0110400 A1*  5/2013 Moshe ............... G01N 1/26
                                                     702/3
2015/0120193 A1   4/2015 Sakurai et al.

FOREIGN PATENT DOCUMENTS

JP   2005-283202   10/2005
JP   2009-062983    3/2009
(Continued)

OTHER PUBLICATIONS

Masafumi Kawai, "Thermal Diffusion of an Air Fin Cooler—Recirculation Phenomena and Their Features", Haikan Gijutsu (The Piping Engineering), Dec. 1994, vol. 36, No. 14, pp. 96-100, with partial English translation.

(Continued)

Primary Examiner — Bryan Bui
(74) Attorney, Agent, or Firm — Jianq Chyun IP Office

(57) ABSTRACT

A weather predicting method includes: selecting, from weather information related to areas and times and including temperature data, weather information sets related to multiple times over a fixed period concerning a first area containing a location where the air utilizing apparatus is placed; by solving, with selected weather information sets as input data, differential equations expressing the weather information based on analysis models for conducting weather simulations, generating a first narrow area weather information sets related to smaller second areas disposed within the first area; selecting a second narrow-area weather information set concerning a second area containing the location of the air utilizing apparatus from among generated first narrow-area weather information sets; and generating a temperature cumulative frequency distribution or a temperature exceedance probability distribution during the fixed period by using temperature data contained in the second narrow-area weather information set for calculating a design temperature of the air utilizing apparatus.

13 Claims, 23 Drawing Sheets

(56) References Cited

FOREIGN PATENT DOCUMENTS

| JP | 2009-294969 | 12/2009 |
|----|-------------|---------|
| JP | 2010-060443 | 3/2010 |
| JP | 2012-008089 | 1/2012 |
| WO | WO2014020778 | 2/2014 |

OTHER PUBLICATIONS

"Decision on Grant of Russian Counterpart Application", issued on Dec. 14, 2015, with English translation thereof, pp. 1-27, in which the listed references were cited.

"Office Action of Canadian Counterpart Application", issued on Dec. 21, 2015 pp. 1-6, in which the listed references were cited.

Kalnay, Eugenia, "Atmospheric modeling, data assimilation and predictability", Dec. 2002, Cambridge University Press.

"Office Action of Canada Counterpart Application," issued on Jul. 22, 2016, p. 1-p. 3.

"International Search Report (Form PCT/ISA/210) of PCT application", mailed on Oct. 15, 2013, with English translation thereof, p. 1-p. 2 in which the listed references (JP2009-294969 and JP2012-008089) were cited..

\* cited by examiner

| TIME | WIND DIRECTION | WIND SPEED | TURBULENCE ENERGY | SOLAR RADIATION | ATMOSPHERIC PRESSURE | PRECIPITATION | HUMIDITY | TEMPERATURE |
|---|---|---|---|---|---|---|---|---|
| Time 1 | N | 3 | . | 1.0 | 980 | 0 | 70 | 31.1 |
| Time 2 | . | . | . | . | . | . | . | 32.2 |
| Time 3 | . | . | . | . | . | . | . | . |
| Time 4 | . | . | . | . | . | . | . | . |
| . | . | . | . | . | . | . | . | . |

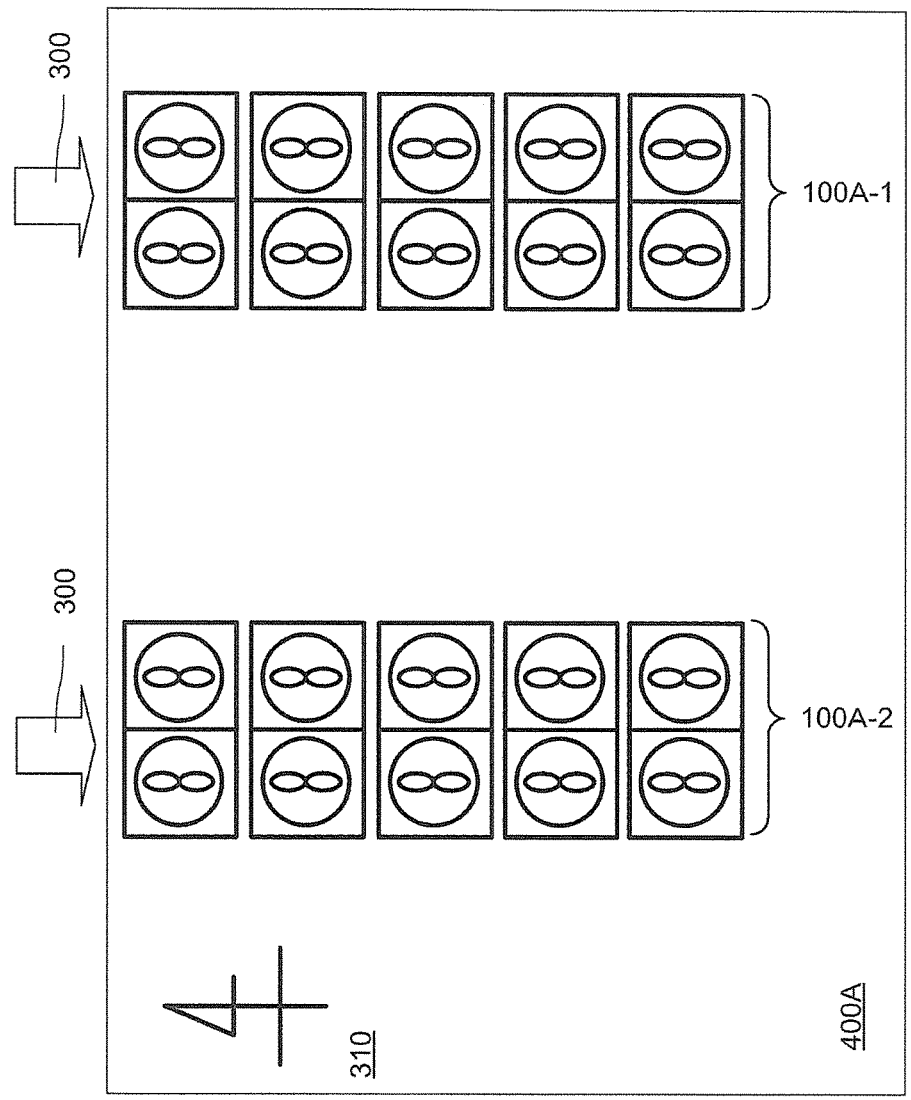

WEATHER PREDICTING METHOD, WEATHER PREDICTING APPARATUS, AND AIR UTILIZING APPARATUS

CROSS-REFERENCE TO RELATED APPLICATION

This application is a 371 of international application of PCT application serial no. PCT/JP2013/070400, filed on Jul. 28, 2013, which claims the priority benefit of Japan application no. 2012-170656, filed on Jul. 31, 2012. The entirety of each of the above-mentioned patent applications is hereby incorporated by reference herein and made a part of this specification.

TECHNICAL FIELD

The present invention relates to a weather predicting method and a weather predicting apparatus for reproducing, by using past weather data, weather data in an area which is smaller than an area corresponding to the past weather data. More particularly, the invention relates to a weather predicting method and a weather predicting apparatus for reproducing weather data in order to design an air utilizing apparatus to be placed in a location in which weather observation data is not available, and also to such an air utilizing apparatus.

BACKGROUND ART

An air utilizing apparatus which is placed outdoors under the influence of surrounding weather conditions and which utilizes air as a heating energy source or a cooling energy source, a power source, and/or a reactant is known. As an air utilizing apparatus which utilizes air as a cooling energy source, an air fin cooler, for example, is known. As an air utilizing apparatus which utilizes air as a power source, a wind power generator is known. As an air utilizing apparatus which utilizes air as a reactant, a gas turbine causing combustion reaction or a reactor causing oxidation reforming reaction is known.

In industrial fields, rotators, heat exchangers, pressure vessels, and so on are designed so that they can be operated safely within specific pressure levels and temperatures called the design pressure and the design temperature, respectively. If the actual operating temperature exceeds the design temperature, it is difficult to achieve a desired level of performance. For example, in the case of a gas turbine, the actual output becomes lower than a desired output, and in the case of an air-cooled heat exchanger, the actual amount of heat exchange becomes lower than a desired amount of heat exchange.

Accordingly, in order to design an air utilizing apparatus, usually, the temperature in an environment of a location in which the air utilizing apparatus will be placed is measured at this location, and the design temperature is decided on the basis of the measured temperature.

For example, the amount of gas exhausted from a gas turbine is a function of weather conditions (temperature, atmospheric pressure, and humidity) at a location in which the gas turbine is placed. Accordingly, a method of estimating an amount of gas emitted from a gas turbine by generating an emission amount output report including emission levels on the basis of a plurality of items of weather data is disclosed (see below, Patent Literature 1). In the disclosed estimating method, when a user wishes to obtain predictions of weather conditions, an access is made to, for example, a third-party weather system, and data from weather services is interpolated together with received data, thereby predicting weather conditions around the gas turbine. In the disclosed estimating method, the weather is forecast in this manner if future weather data is not available.

Weather forecasts utilizing weather simulations (see below, Patent Literature 2), or technologies concerning the prediction of the diffusion of radioactive materials (see below, Patent Literature 3) are also disclosed.

PRIOR ART DOCUMENT

Patent Literature

Patent Literature 1: Japanese Unexamined Patent Application Publication No. 2009-62983
Patent Literature 2: Japanese Unexamined Patent Application Publication No. 2010-60443
Patent Literature 3: Japanese Unexamined Patent Application Publication No. 2005-283202

SUMMARY OF THE INVENTION

Technical Problem

As described above, when measuring the temperature and the direction of the wind in an area in which an air utilizing apparatus will be placed, measurements over several years are required since it is necessary to design an air utilizing apparatus by considering the influence of an annual change, such as whether or not the El Nino phenomenon is observed. However, if there is no data over the years, an air utilizing apparatus has to be designed on the basis of low-precision environmental data, since it is difficult to measure the temperature and the direction of the wind for several years in future from a present time point.

Patent Literature 1 discloses that certain measures are taken in advance by utilizing weather information so as to prevent the occurrence of the lean blowout in a combustion system during the operation for decreasing the emission amount of NOx. An object of Patent Literature 2 or Patent Literature 3 is to predict future weather conditions, such as to forecast the weather or to predict the diffusion of dangerous materials. Accordingly, Patent Literature 1 through Patent Literature 3 do not whatsoever disclose that the weather is predicted by utilizing weather simulations for the purpose of designing an air utilizing apparatus.

Solution to Problem

Embodiments to solve the above mentioned problems are realized as a first set shown in the following item sets.

Item A1. A weather predicting method for predicting the weather by conducting weather simulations in order to design an air utilizing apparatus which is placed outdoors under the influence of surrounding weather conditions and which utilizes air as one of a heating energy source and a reactant, the weather predicting method including:

selecting, from a plurality of items of weather information which are related to areas and times and which include at least temperature data, a plurality of weather information sets related to a plurality of times over a fixed period concerning a first area containing a location at which the air utilizing apparatus is placed;

by solving, with the use of the selected plurality of weather information sets as input data, differential equations expressing the weather information based on analysis models used for conducting weather simulations, generating a plurality of first narrow-area weather information sets related to a plurality of second areas which are disposed within the first area and which are smaller than the first area;

selecting a second narrow-area weather information set concerning a second area containing the location of the air utilizing apparatus from among the generated plurality of first narrow-area weather information sets; and generating a temperature cumulative frequency distribution or a temperature exceedance probability distribution during the fixed period by using temperature data contained in the second narrow-area weather information set in order to calculate a design temperature of the air utilizing apparatus.

Item A2. The weather predicting method according to Item A1, further including:

outputting the temperature cumulative frequency distribution or the temperature exceedance probability distribution, wherein the temperature cumulative frequency distribution or the temperature exceedance probability distribution includes one of the following as the design temperature (a) a temperature at which a cumulative frequency indicated by the temperature cumulative frequency distribution exceeds at least 50%, (b) a temperature at which an exceedance probability indicated by the temperature exceedance probability distribution is smaller than at least 50%, and (c) a temperature obtained by adding a temperature margin to the temperature at which the cumulative frequency exceeds 50% or the temperature at which the exceedance probability is smaller than 50%.

Item A3. The weather predicting method according to Item A1, further including:

calculating meteorological field information concerning an area smaller than the second area corresponding to the second area corresponding to the second narrow-area weather information by computing the second narrow-area weather information by using three-dimensional fluid dynamic equations.

Item A4. The weather predicting method according to Item A3, further including:

calculating, by using the meteorological field information, a flow in which heated air discharged from the air utilizing apparatus is returned to and recirculates in a suction unit of the air utilizing apparatus.

Item A5. The weather predicting method according to Item A4, further including:

a step of deciding the temperature margin on the basis of the flow.

Item A6. The weather predicting method according to Item A1, wherein a step of generating the first narrow-area weather information sets further includes recalculating the first narrow-area weather information sets by using observation data indicating at least one of a wind direction, a wind speed, and a temperature in an area corresponding to the weather information.

Item A7. The weather predicting method according to Item A1, wherein the first narrow-area weather information and the second narrow-area weather information are three-dimensional data, and indicate at least one of a wind direction, a wind speed, turbulence energy, solar radiation, atmospheric pressure, precipitation, humidity, and temperature.

Item A8. A weather predicting apparatus for predicting the weather by conducting weather simulations in order to design an air utilizing apparatus which is placed outdoors under the influence of surrounding weather conditions and which utilizes air as one of a heating energy source and a reactant, the weather predicting apparatus including:

a storage section that stores therein a plurality of items of weather information which are related to areas and times and which include at least temperature data; and a processor that selects, from the plurality of items of weather information, a plurality of weather information sets related to a plurality of times over a fixed period concerning a first area containing a location at which the air utilizing apparatus is placed, that generates a plurality of first narrow-area weather information sets related to a plurality of second areas which are disposed within the first area and which are smaller than the first area, by solving, with the use of the selected plurality of weather information sets as input data, differential equations expressing the weather information based on analysis models used for conducting weather simulations, that selects a second narrow-area weather information set concerning a second area containing the location of the air utilizing apparatus from among the generated plurality of first narrow-area weather information sets, and that generates a temperature cumulative frequency distribution or a temperature exceedance probability distribution during the fixed period by using temperature data contained in the second narrow-area weather information set in order to calculate a design temperature of the air utilizing apparatus.

Item A9. The weather predicting apparatus according to Item A8, wherein:

the temperature cumulative frequency distribution or the temperature exceedance probability distribution includes one of the following as the design temperature (a) a temperature at which a cumulative frequency indicated by the temperature cumulative frequency distribution exceeds at least 50%, (b) a temperature at which an exceedance probability indicated by the temperature exceedance probability distribution is smaller than at least 50%, and (c) a temperature obtained by adding a temperature margin to the temperature at which the cumulative frequency exceeds 50% or the temperature at which the exceedance probability is smaller than 50%; and the processor outputs the temperature cumulative frequency distribution or the temperature exceedance probability distribution.

Item A10. The weather predicting apparatus according to Item A8, wherein the processor calculates meteorological field information concerning an area smaller than the second area corresponding to the second area corresponding to the second narrow-area weather information by computing the second narrow-area weather information by using three-dimensional fluid dynamic equations.

Item A11. The weather predicting apparatus according to Item A10, wherein the processor calculates, by using the meteorological field information, a flow in which heated air discharged from the air utilizing apparatus is returned to and recirculates in a suction unit of the air utilizing apparatus.

Item A12. The weather predicting apparatus according to Item A11, wherein the processor decides the temperature margin on the basis of the flow.

Item A13. The weather predicting apparatus according to Item A8, wherein, in a step of generating the first narrow-area weather information sets, the processor recalculates the first narrow-area weather information sets by using observation data indicating at least one of a wind direction, a wind speed, and a temperature in an area corresponding to the weather information.

Item A14. The weather predicting apparatus according to Item A8, wherein the first narrow-area weather information and the second narrow-area weather information are three-dimensional data, and indicate at least one of a wind direction, a wind speed, turbulence energy, solar radiation, atmospheric pressure, precipitation, humidity, and temperature.

Item A15. An air utilizing apparatus which is placed outdoors under the influence of surrounding weather conditions and which utilizes air as one of a heating energy source and a reactant, the air utilizing apparatus including:

a suction unit that sucks the air;

an operation unit that performs one of heat exchange and reaction by using the air sucked by the suction unit; and a discharge unit that discharges gas emitted through one of operations of heat exchange and reaction, wherein from a plurality of items of weather information which are related to areas and times and which include at least temperature data, a plurality of weather information sets related to a plurality of times over a fixed period concerning a first area containing a location at which the air utilizing apparatus is placed are selected, by solving, with the use of the selected plurality of weather information sets as input data, differential equations expressing the weather information based on analysis models used for conducting weather simulations, a plurality of first narrow-area weather information sets related to a plurality of second areas which are disposed within the first area and which are smaller than the first area are generated, a second narrow-area weather information set concerning a second area containing the location of the air utilizing apparatus is selected from among the generated plurality of first narrow-area weather information sets, a temperature cumulative frequency distribution or a temperature exceedance probability distribution during the fixed period is generated by using temperature data contained in the second narrow-area weather information set in order to calculate a design temperature of the air utilizing apparatus, and the air utilizing apparatus is designed on the basis of a design temperature selected from, (a) a temperature at which a cumulative frequency indicated by the temperature cumulative frequency distribution exceeds at least 50%, (b) a temperature at which an exceedance probability indicated by the temperature exceedance probability distribution is smaller than at least 50%, and (c) a temperature obtained by adding a temperature margin to the temperature at which the cumulative frequency exceeds 50% or the temperature at which the exceedance probability is smaller than 50%.

Item A16. The air utilizing apparatus according to Item A15, wherein the air utilizing apparatus is designed on the basis of a design temperature obtained by computing the second narrow-area weather information by using three-dimensional fluid dynamic equations and by calculating meteorological field information concerning an area smaller than the second area corresponding to the second area corresponding to the second narrow-area weather information.

Item A17. The air utilizing apparatus according to Item A15, wherein the air utilizing apparatus is designed on the basis of a design temperature obtained by calculating, by using the meteorological field information, a flow in which heated air discharged from the air utilizing apparatus is returned to and recirculates in a suction unit of the air utilizing apparatus and by deciding the temperature margin on the basis of the flow.

Item A18. The air utilizing apparatus according to Item A15, wherein, in a step of generating the first narrow-area weather information sets, the first narrow-area weather information sets are recalculated by using observation data indicating at least one of a wind direction, a wind speed, and a temperature in an area corresponding to the weather information.

Embodiments to solve the above mentioned problems are realized as a second set shown in the following item sets.

B1. A weather predicting method for predicting the weather by conducting weather simulations in order to design an air utilizing apparatus which is placed outdoors under the influence of surrounding weather conditions and which utilizes air as one of a heating energy source, a power source, and a reactant, the weather predicting method including:

selecting, from a plurality of items of weather information which includes at least wind direction data and which is related to times and areas, a set of items of weather information related to an area containing a location at which the air utilizing apparatus is placed and related to a plurality of times over a certain period;

by solving, with the use of each item of the set of the items of weather information as input data, differential equations expressing the weather information based on weather analysis models used for conducting weather simulations, generating a set of items of first narrow-area weather information related to regions smaller than the area corresponding to the weather information;

selecting a set of items of second narrow-area weather information concerning a region containing the location of the air utilizing apparatus from among the items of first narrow-area weather information; and calculating a wind direction having the highest cumulative frequency by using wind direction data contained in the set of the items of second narrow-area weather information in order to determine a direction in which the air utilizing apparatus is placed.

B2. The weather predicting method according to Item B1, wherein, on the basis of the calculated wind direction, a layout in which the air utilizing apparatus is placed in the region such that gas discharged from a discharge unit of the air utilizing apparatus located on a windward side will not be sucked by a suction unit of the air utilizing apparatus located on a leeward side is generated.

B3. The weather predicting method according to Item B1 or B2, wherein a step of generating the set of the items of first narrow-area weather information further includes recalculating the set of the items of first narrow-area weather information by using observation data indicating at least one of a wind direction, a wind speed, and a temperature in the area corresponding to the weather information.

B4. The weather predicting method according to any one of Items B1 to B3, further including:

calculating meteorological field information concerning a region smaller than the region corresponding to the second narrow-area weather information by computing the second narrow-area weather information by using three-dimensional fluid dynamic equations; and calculating, by using the meteorological field information, a flow in which heated air discharged from the air utilizing apparatus is returned to the suction unit of the air utilizing apparatus.

B5. The weather predicting method according to any one of Items B1 to B4, further including:

recalculating, if topographical features of the region in which the air utilizing apparatus is placed are different from topographical features described in the weather information due to a reason of one of land leveling, land use, and equipment installation, the set of the items of first narrow-area weather information on the basis of topographical information reflecting a result of associated one of the land leveling, the land use, and the equipment installation.

B6. The weather predicting method according to any one of Items B1 to B5, wherein the first narrow-area weather information and the second narrow-area weather information are three-dimensional data, and indicate at least one of wind direction, wind speed, turbulence energy, solar radiation, atmospheric pressure, precipitation, humidity, and temperature.

B7. A weather predicting apparatus for predicting the weather by conducting weather simulations in order to design an air utilizing apparatus which is placed outdoors under the influence of surrounding weather conditions and which utilizes air as one of a heating energy source, a power source, and a reactant, the weather predicting apparatus including:

a storage section that stores therein a set of items of weather information obtained from a plurality of items of weather information which includes at least wind direction data and which is related to times and areas, the set of items of weather information being related to an area containing a location at which the air utilizing apparatus is placed and related to a plurality of times over a certain period; and a processor that selects the set of items of weather information, generates a set of items of first narrow-area weather information related to regions smaller than the area corresponding to the weather information by solving, with the use of each item of the set of the items of weather information as input data, differential equations expressing the weather information based on weather analysis models used for conducting weather simulations, selects a set of items of second narrow-area weather information concerning a region containing the location of the air utilizing apparatus from among the items of first narrow-area weather information, and calculates a wind direction having the highest cumulative frequency by using wind direction data contained in the set of the items of second narrow-area weather information in order to determine a direction in which the air utilizing apparatus is placed.

B8. The weather predicting apparatus according to Item B7, wherein, on the basis of the calculated wind direction, the processor generates a layout in which the air utilizing apparatus is placed in the region such that gas discharged from a discharge unit of the air utilizing apparatus located on a windward side will not be sucked by a suction unit of the air utilizing apparatus located on a leeward side.

B9. The weather predicting apparatus according to Item B7 or B8, wherein the processor recalculates, in a step of generating the set of the items of first narrow-area weather information, the set of items of first narrow-area weather information by using observation data indicating at least one of a wind direction, a wind speed, and a temperature in the area corresponding to the weather information.

B10. The weather predicting apparatus according to any one of Items B7 to B9, wherein the processor calculates meteorological field information concerning a region smaller than the region corresponding to the weather data by computing the second narrow-area weather information by using three-dimensional fluid dynamic equations, and calculates, by using the meteorological field information, a flow in which heated air discharged from the air utilizing apparatus is returned to the suction unit of the air utilizing apparatus.

B11. The weather predicting apparatus according to any one of Items B7 to B10, further including:

recalculating, if topographical features of the region in which the air utilizing apparatus is placed are different from topographical features described in the weather information due to a reason of one of land leveling, land use, and equipment installation, the set of the items of first narrow-area weather information on the basis of topographical information reflecting a result of associated one of the land leveling, the land use, and the equipment installation.

B12. The weather predicting apparatus according to any one of Items B7 to B11, wherein the first narrow-area weather information and the second narrow-area weather information are three-dimensional data, and indicate at least one of wind direction, wind speed, turbulence energy, solar radiation, atmospheric pressure, precipitation, humidity, and temperature.

B13. An air utilizing apparatus which is placed outdoors under the influence of surrounding weather conditions and which utilizes air as one of a heating energy source, a power source, and a reactant, the air utilizing apparatus including:

a suction unit that sucks the air;

an operation unit that performs one of heat exchange, reaction, and power recovery by using the air sucked by the suction unit; and a discharge unit that discharges gas emitted through one of operations of heat exchange, reaction, and power recovery, wherein:

from a plurality of items of weather information which includes at least wind direction data and which is related to times and areas, a set of items of weather information related to an area containing a location at which the air utilizing apparatus is placed and related to a plurality of times over a certain period are selected;

by solving, with the use of each item of the set of the items of weather information as input data, differential equations expressing the weather information based on weather analysis models used for conducting weather simulations, a set of items of first narrow-area weather information related to regions smaller than the area corresponding to the weather information is generated;

a set of items of second narrow-area weather information concerning a region containing the location of the air utilizing apparatus is selected from among the items of first narrow-area weather information; and the air utilizing apparatus is placed in the region on the basis of a wind direction having the highest cumulative frequency calculated by using wind direction data contained in the set of the items of second narrow-area weather information.

B14. The air utilizing apparatus according to Item B13, wherein the air utilizing apparatus is placed such that gas discharged from the discharge unit located on a windward side indicated in the wind direction data included in the set of the items of second narrow-area weather information will not be sucked by the suction unit located on a leeward side indicated in the wind direction data included in the set of the items of second narrow-area weather information.

B15. The air utilizing apparatus according to Item B13 or B14, wherein:

meteorological field information concerning a region smaller than the region corresponding to the second narrow-area weather information is calculated by computing the second narrow-area weather information by using three-dimensional fluid dynamic equations, and by using the meteorological field information, a flow in which heated air discharged from the air utilizing apparatus is returned to the suction unit of the air utilizing apparatus is calculated; and the air utilizing apparatus is placed such that the heated air discharged from the air utilizing apparatus will not be returned to the suction unit.

In the disclosed weather predicting method and the weather predicting apparatus, even if weather data concerning a location in which an air utilizing apparatus will be placed is not available, it is possible to obtain the temperature necessary for designing the air utilizing apparatus, on the basis of the weather which is predicted by conducting weather simulations in an area which includes the location at which the air utilizing apparatus is placed, by the use of, as input data, weather information related to the area which includes the location at which the air utilizing apparatus is placed and related to a plurality of times over a certain period.

BRIEF DESCRIPTION OF THE DRAWINGS

FIG. 1B illustrates an example of a data table of weather information.

DESCRIPTION OF EMBODIMENTS

Figure 1A:
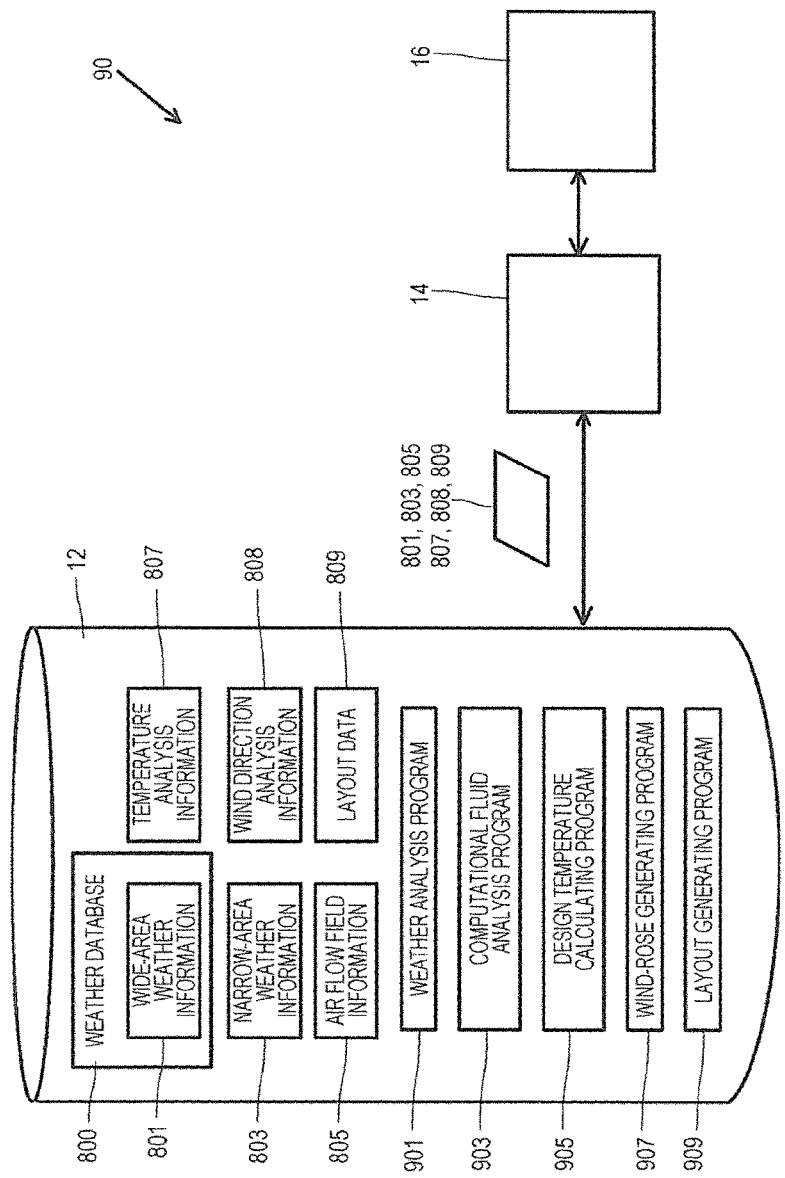
FIG. 1A illustrates an example of the functional configuration of a weather predicting apparatus.

With reference to the drawings, descriptions will now be given of: 1. Weather Analysis Models; 2. Computational Fluid Analysis; 3. Functional Configuration and Hardware Configuration of Weather Predicting Apparatus; 4. Air Utilizing Apparatus; 5. Prediction of Weather Information around Air Utilizing Apparatus; 6. Temperature Cumulative Frequency Distribution around Air Utilizing Apparatus; 7. Relationship between Design Temperature and Manufacturing Amount in Liquefaction Plants; 8. Wind Rose around Air Utilizing Apparatus; 9. Layout in which Air Utilizing Apparatus is Arranged and Air Utilizing Apparatus on the basis of the Layout; 10. Flowchart of Temperature Analysis and Design; and 11. Flowchart of Wind-Direction Analysis and Design.

1. Weather Analysis Models

Weather analysis models include various physical models, and by analyzing such physical models by using a computer, calculations for predicting the weather having higher spatial resolution are performed, thereby making it possible to conduct weather simulations. Weather simulations have an advantage over field observation that weather information having a higher spatial resolution can be estimated.

In order to conduct weather simulations, it is necessary to load initial values and boundary value data from a weather database downloaded from a network. A sufficiently detailed spatial resolution for designing an air utilizing apparatus is not available. However, as weather information concerning a wide area including an area in which an air utilizing apparatus is placed (hereinafter referred to as a "wide-area weather information"), for example, NCEP (National Centers for Environmental Prediction), which is global observation analysis data reanalyzed every six hours, provided by, for example, NOAA (National Oceanic and Atmospheric Administration), is available. NCEP data as the wide-area weather information include weather elements (wind direction, wind speed, turbulence energy, solar radiation, atmospheric pressure, precipitation, humidity, and temperature) on three-dimensional grid points obtained by dividing the world into a grid pattern (grid spacing is 1.5 km through 400 km), and are updated every six hours. In this embodiment, it is necessary to design an air utilizing apparatus by considering the influence of an annual change, such as whether or not the El Nino phenomenon is observed. Accordingly, wide-area weather information over the several years (for example, the above-described NCEP data) is used as initial values and boundary value data.

An example of physical models included in weather analysis models is the WRF (Weather Research & Forecasting Model). The WRF include various physical models. Examples of the physical models are radiation models for calculating the amount of solar radiation and the amount of atmospheric radiation, turbulence models for expressing a turbulence mixed layer, and ground surface models for calculating the ground surface temperature, soil temperature, field moisture, snowfall amount, and surface flux.

The weather analysis models include partial differential equations expressing the motion of fluid in the atmosphere, such as Navier-Stokes equations concerning the motion of fluid and empirical equations derived from atmospheric observation results, and partial differential equations expressing the law of conservation of mass and the law of conservation of energy. By solving these simultaneous partial differential equations, weather simulations can be conducted. Thus, by using wide-area weather information as input data indicating initial values and boundary value data, differential equations based on weather analysis models for weather simulations are solved, thereby making it possible to generate weather information concerning a location of an air utilizing apparatus related to an area having a narrower spatial resolution than that of wide-area weather information. Weather information generated in this manner is referred to as "narrow-area weather information".

2. Computational Fluid Analysis

Computational fluid analysis is a numerical analysis and simulation technique for observing the flow of fluid by applying Computational Fluid Dynamics in which equations concerning the motion of fluid are solved by using a computer. More specifically, by using Navier-Stokes equations, which are fluid dynamic equations, the state of fluid is spatially calculated by utilizing the Finite Volume Method. The procedure for computational fluid analysis includes a step of creating 3D model data reflecting a structure of a facility, which is a subject to be examined, a step of generating grids by dividing a range of the subject to be examined into grids, which are the minimum calculation units, a step of loading initial values and boundary values and solving fluid dynamic equations concerning each grid by using a computer, and a step of outputting various values (flow velocity, pressure, etc.) obtained from analysis results, as images, such as contours and vectors.

By conducting computational fluid analysis, fluid simulations having higher resolution than those obtained by weather analysis models can be implemented. Thus, it is possible to provide information concerning air current phenomena unique to a space scale of a subject to be examined, such as small changes in the wind speed and the wind direction and a change in air current around a building caused by a disturbance of an air current on a scale from several centimeters to several meters, which are very difficult to predict by weather simulations.

3. Functional Configuration and Hardware Configuration of Weather Predicting Apparatus A weather predicting apparatus uses weather analysis models and conducts computational fluid analysis, thereby calculating narrow-area weather information concerning a narrow area in which an air utilizing apparatus is placed. And, the weather predicting apparatus may also perform design temperature calculating processing or wind-rose generating processing, which will be discussed later.

FIG. 1 illustrates an example of the functional configuration of a weather predicting apparatus. A weather predicting apparatus 90 shown in FIG. 1 includes a storage section 12 which stores therein data and programs and a processor 14 which executes arithmetic operations. In the storage section 12, a weather analysis program 901, such as the WRF, a computational fluid analysis program 903, a design temperature calculating program 905, a wind-rose generating program 907, a layout output program 909 for generating a layout, a weather database 800, wide-area weather information 801, such as NCEP data, narrow-area weather information 803 obtained by weather simulations, air flow field information 805 obtained by computational fluid analysis, temperature analysis information 807, wind direction analysis information 808, and layout data 809 are stored. The weather database stores therein the wide-area weather information 801, which is obtained as a result of downloading it from an external source or is obtained from a storage medium.

The processor 14 executes the weather analysis program 901 and thereby performs weather analysis processing in which the narrow-area weather information 803 is generated from the wide-area weather information 801 and is stored in the storage section 12. The processor 14 also executes the computational fluid analysis program 903 and thereby performs computational fluid processing in which the air flow field information 805 is generated from the narrow-area weather information 803 and is stored in the storage section 12. Similarly, the processor 14 also executes the design temperature calculating program 905 and the wind-rose generating program 907 and thereby performs design temperature calculating processing and wind-rose generating processing, respectively, which will be discussed later, and displays the related temperature analysis information 807 and the related wind direction analysis information 808, respectively, on a display section 16 which displays data, such as images.

Further, the processor 14 executes the layout generating program 909 and outputs the layout data 809 on the basis of the wind direction analysis information 808.

FIG. 1B illustrates an example of a data table of weather info nation. The data table shown in FIG. 1B indicates the wide-area weather information 801, but may also be applied to the narrow-area weather information 803. The wide-area weather information indicates weather information concerning a wider area than narrow areas corresponding to the narrow-area weather information, and such a wider area includes the narrow areas corresponding to the narrow-area weather information. The weather information is, as shown in FIG. 1B, a plurality of record sets constituted by various items of data indicating the wind direction, wind speed, turbulence energy, solar radiation, atmospheric pressure, precipitation, humidity, and temperature, by using the time as a primary key. In other words, the data table shown in FIG. 1B is constituted by weather information sets classified based on the temperature, and each of the wide-area weather information 801 and the narrow-area weather information 803 is constituted by a plurality of weather information sets classified based on the area.

Figure 2:
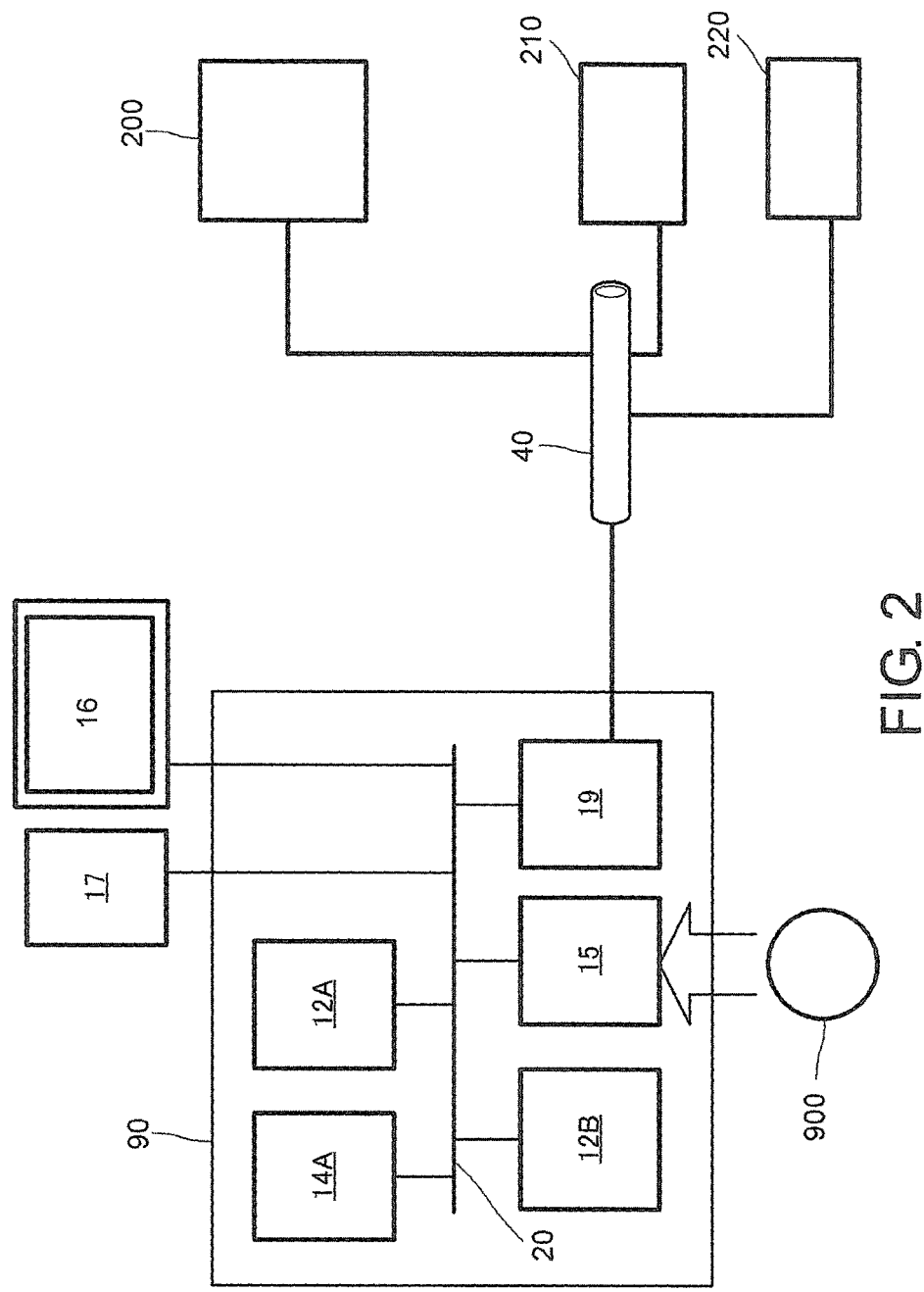
FIG. 2 illustrates an example of the hardware configuration of the weather predicting apparatus.

FIG. 2 illustrates an example of the hardware configuration of the weather predicting apparatus. The weather predicting apparatus 90 shown in FIG. 2 includes a processor 12A, a main storage device 14A, an auxiliary storage device 14B, which is a hard disk or an SSD (Solid State Drive), a drive device 15 that reads data from a storage medium 900, and a communication device 19, such as an NIC (network interface card). These components are connected to one another via a bus 20. The weather prediction apparatus 90 is connected to a display section 16, which serves as an output device, and an input device 17, such as a keyboard and a mouse, which are externally disposed. The processor 12 shown in FIG. 1A corresponds to the processor 12A, and the storage section 14 corresponds to the main storage device 14A.

In the storage medium 900, the weather database 800, the weather analysis program 901, the computational fluid analysis program 903, the design temperature calculating program 905, the wind-rose generating program 907, and the layout generating program 909 shown in FIG. 1A may be stored as data items. These data items 800 through 909 are stored in the storage section 12, as shown in FIG. 1A.

The weather predicting apparatus 90 may be connected to an external server 200 or a computer 210 or 220 via a network 40. The computer 210 and the external server 200 may have the same components as those of the weather predicting apparatus 90. For example, the weather predicting apparatus 90 may receive the weather database 800 stored in the server 200 via the network 40. Alternatively, among the programs shown in FIG. 1A, only the weather analysis program 901 concerning weather simulations having a high system load may be stored in the weather predicting apparatus 90, and the other programs may be stored in any one of the computers 210 and 220 and may be executed in the computer 210 or 220.

Additionally, a description has been given above in which the weather predicting apparatus 90 is restricted to hardware, such as a computer. However, the weather predicting apparatus 90 may be a virtual server in a data center. In this case, the hardware configuration may be as follows. The programs 901 through 909 may be stored in a storage section in a data center, and a processor in the data center may execute the stored programs 901 through 909, and data may be output from the data center to a client computer. The external server 200 may include a weather database, in which case, the weather predicting apparatus 90 may obtain wide-area weather data from the external server 200.

4. Air Utilizing Apparatus

FIG. 3A illustrates an example of an air utilizing apparatus. An air utilizing apparatus 100 shown in FIG. 3A is placed outdoors under the influence of surrounding weather conditions and utilizes air as one of a heating energy source, a power source, and a reactant. The air utilizing apparatus 100 includes a suction unit 101 which sucks air, an operation unit 102 which performs one of heat exchange, reaction, and power recovery by using air sucked by the suction unit, and a discharge unit 103 which discharges gas emitted through one of the operations of heat exchange, reaction, and power recovery, though these elements are not essential components.

FIG. 3B illustrates a specific example of the air utilizing apparatus. FIG. 3B illustrates an air fin cooler 100A and a gas turbine 100B as examples of the air utilizing apparatus 100. The gas turbine 100B includes a suction unit 101B, an operation unit 102B, and a discharge unit (chimney) 103B. By the use of air sucked by the suction unit 101B, inflammable gas is burned in the operation unit 102B so as to rotate a turbine to generate a driving force, thereby rotating a compressor 110A. The exhaust gas is discharged from the chimney 103B. The gas compressed by the compressor 110A is supplied to the air fin cooler 100A. The operation unit 102B shown in FIG. 3B may be a reactor which causes oxidation reforming reaction.

In the air fin cooler 100A, discharged gas heated by the compressor 110 is cooled in a heat exchanger 102A by using air sucked through a suction unit 101A (not shown) provided at the bottom of the air fin cooler 100A and is discharged to a discharge unit 103A (not shown) provided at the top of the air fin cooler 100A. The temperature of the compressed gas cooled by the air fin cooler 100A is decreased in a cooler 120 due to decompression and expansion, and then, the compressed gas cools a subject medium. The decompressed and heated gas is again returned to the compressor 110A. In an embodiment, the subject medium to be cooled is, for example, a hydrocarbon gas, such as methane or ethane, and is cooled in the cooler 120 and is thereby liquefied.

The air utilizing apparatus has been discussed through illustration of one of the air fin cooler and the gas turbine. However, the air utilizing apparatus may be a liquefaction plant for liquefying a hydrocarbon gas, including an air fin cooler and a gas turbine. Hereinafter, an embodiment of the weather predicting apparatus or the weather predicting method through illustration of an air fin cooler, a gas turbine, or a liquefaction plant will be described. However, an embodiment of the present invention encompasses an air fin cooler, a gas turbine, and a liquefaction plant based on a layout designed by the weather predicting apparatus or the weather predicting method.

FIG. 3C illustrates another specific example of the air utilizing apparatus. As an example of the air utilizing apparatus, a wind power generator 100C is shown. Propellers of the wind power generator 100C correspond to a suction unit 101C and a discharge unit 103C, and a motor corresponds to an operation unit 102C.

5. Reproduction of Weather Information Around Air Utilizing Apparatus

Figure 4:
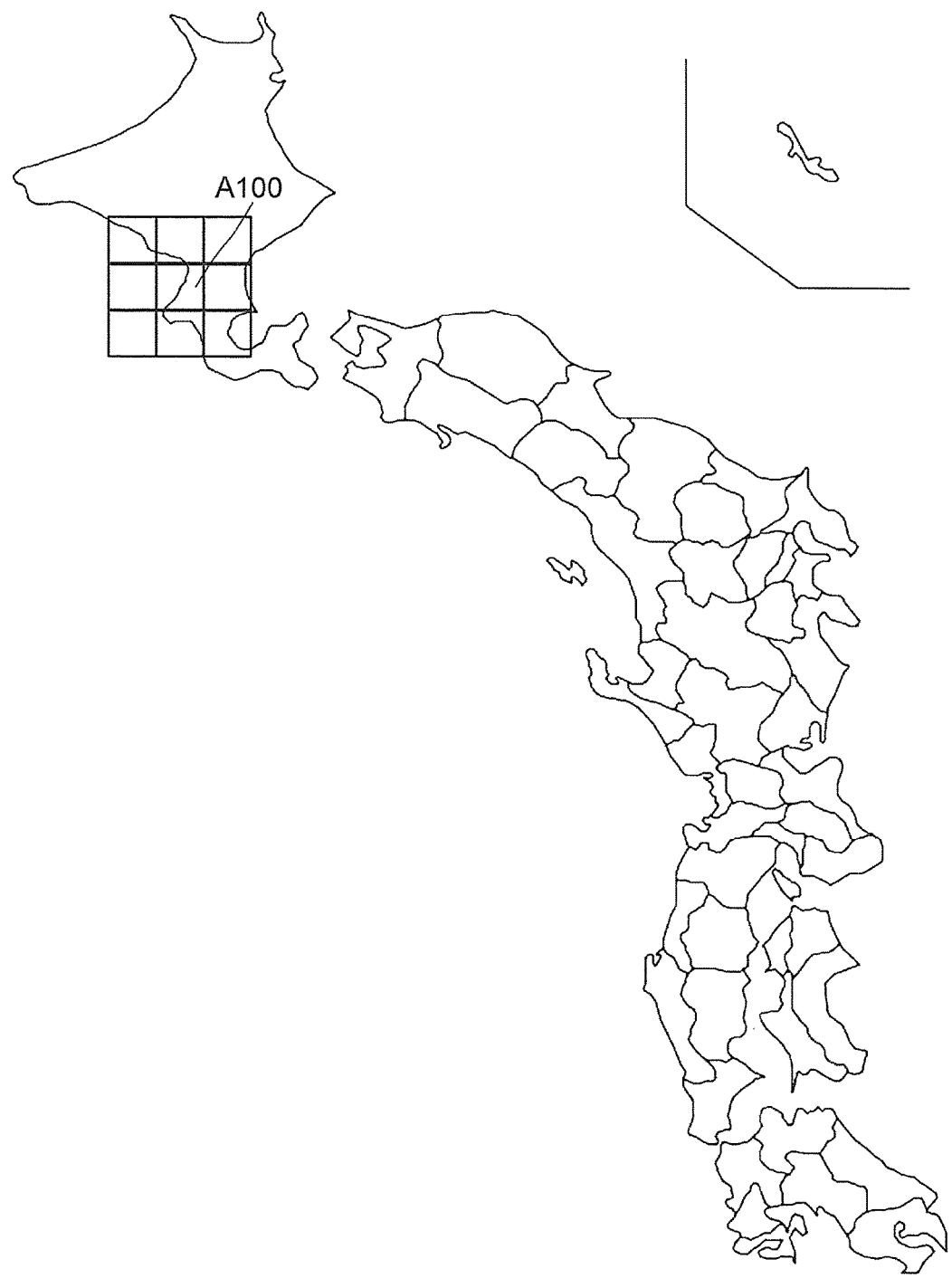
FIG. 4A illustrates an example of wide-area weather information.
FIG. 4B illustrates an example in which the wide-area weather information shown in FIG. 4A is enlarged.
Figure 4:
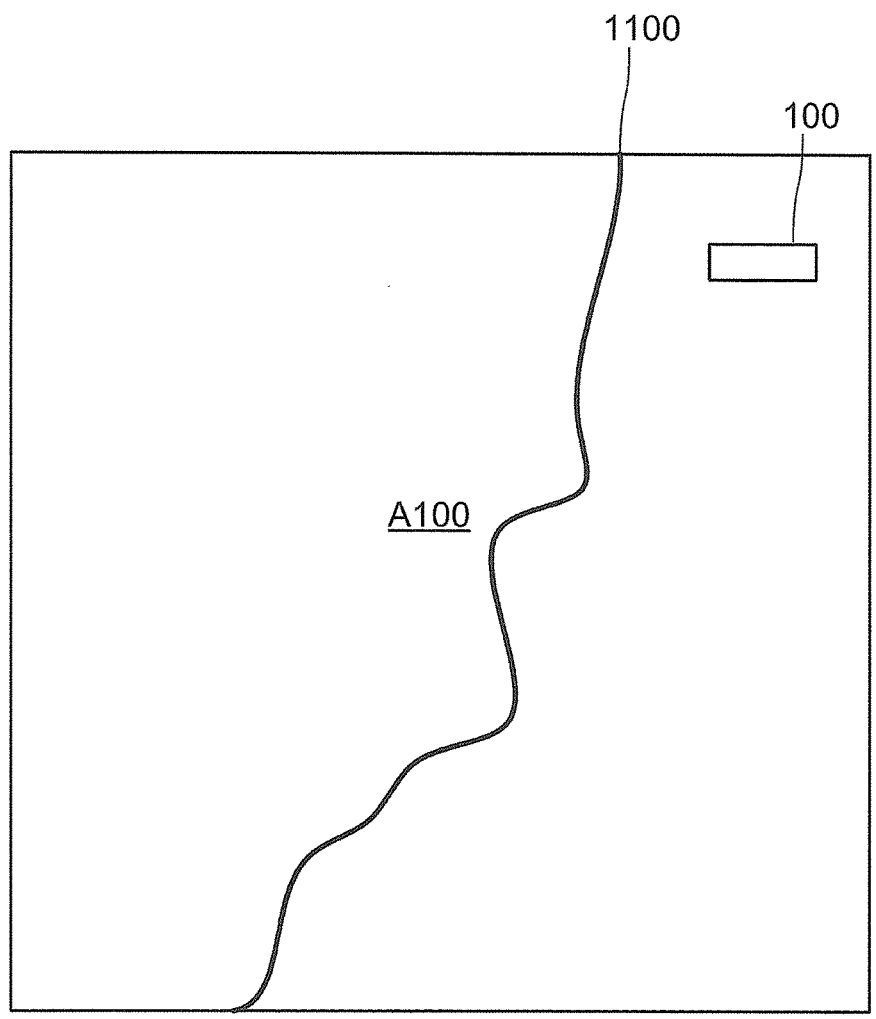

FIG. 4A illustrates an example of wide-area weather information. In FIG. 4A, wide-area weather information A100 on a map of Japan is shown.

Figure 5:
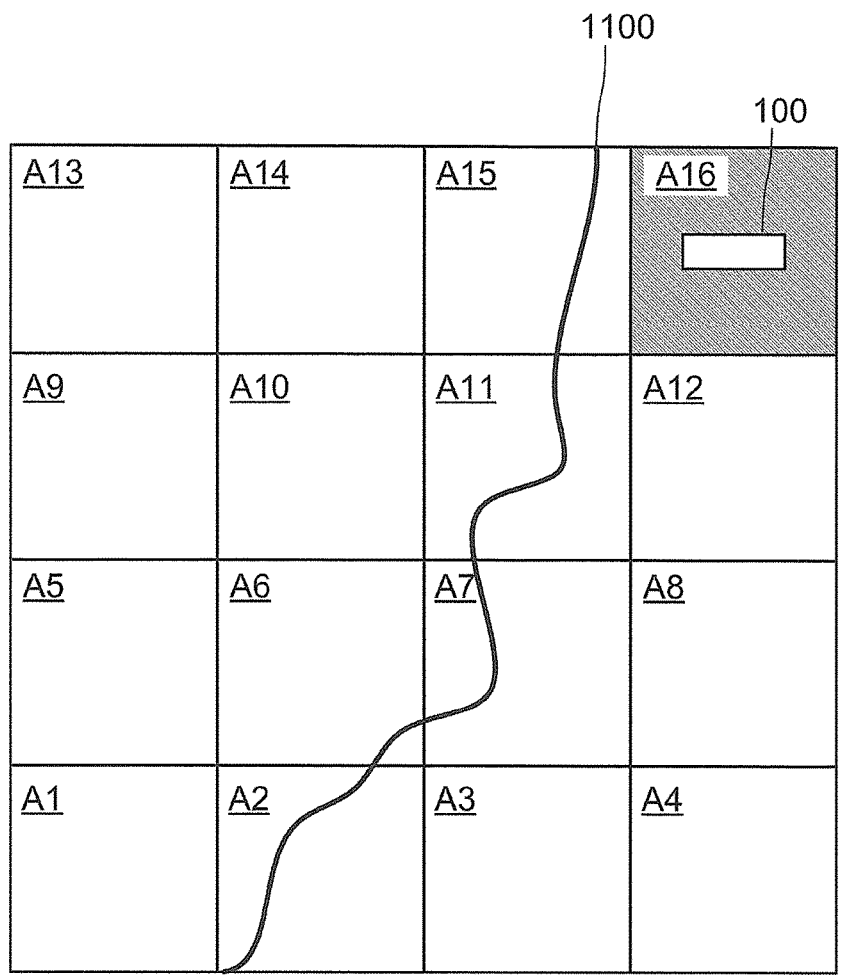
FIG. 5 illustrates an example of narrow-area weather information.

FIG. 4B illustrates an example in which the wide-area weather information shown in FIG. 4A is enlarged. In the wide-area weather information A100 shown in FIG. 4B, an area in which the air utilizing apparatus 100 is placed is shown. Reference numeral 1100 designates a coastline. The left side of the coastline 1100 in the plane of the drawing is the sea, and the right side thereof is the land. FIG. 5 illustrates an example of narrow-area weather information. FIG. 5 illustrates an area for which weather simulations are conducted, and the area is partitioned into a plurality of zones A1 through A15 in order to conduct weather simulations, and each zone corresponds to a calculation grid. For example, if the grid resolution is 9 km, the calculation zone is 549 km×549 km. If the grid resolution is 1 km, the calculation zone is 93 km×93 km. Accordingly, in these zones A1 through A15, estimation points are set in a grid pattern at intervals of 1 km through 9 km in the north-south direction and the east-west direction.

The air utilizing apparatus 100 is placed, as shown in FIG. 5, and in order to obtain the temperature or the direction of the wind in the zone in which the air utilizing apparatus 100 is placed, the processor 12 generates narrow-area weather information items A1 through A16 from the wide-area weather information A100 by solving partial differential equations expressing weather information based on weather analysis models.

Figure 6:
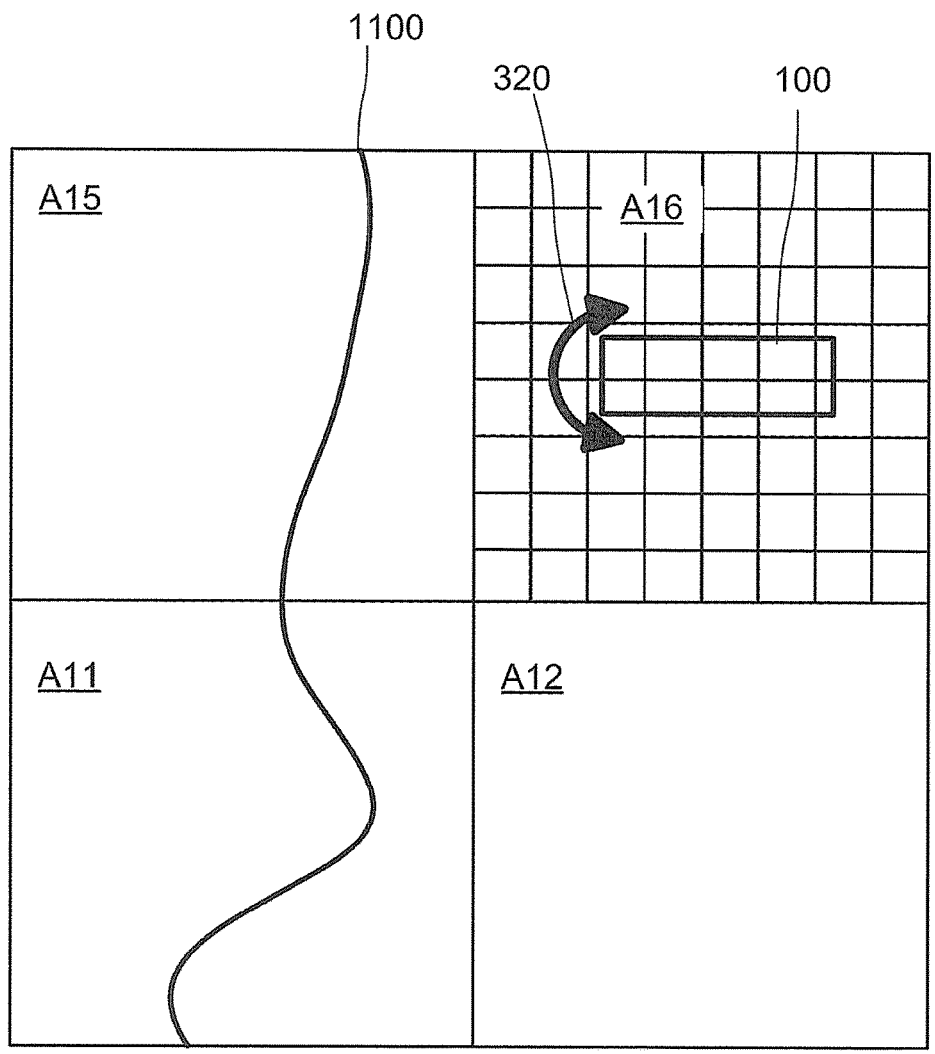
FIG. 6 illustrates an example of meteorological field information.

FIG. 6 illustrates an example of meteorological field information. The processor 12 conducts computational fluid analysis on the narrow-area weather information item A16 shown in FIG. 6, thereby calculating meteorological field information concerning an area smaller than the zones of narrow-area weather information. After calculating the meteorological field information concerning the zone A15, by using the meteorological field information concerning the zone A15 as an initial value, the processor 12 may determine detailed meteorological field information around the air utilizing apparatus 100 by using fluid dynamic models (CFD models). In this case, the detailed meteorological field information can be determined with a resolution in increments of 0.5 m, which is much smaller than the grid resolution (for example, 1 km) used in weather simulations.

The meteorological field information concerning the target zone A16 in which the air utilizing apparatus 100 is placed can be determined by using fluid dynamic models. Thus, precise data taking the configurations of buildings into consideration can be obtained. Examples of fluid dynamic models are K-$\epsilon$, LES, and DNS.

It is sufficient that a computer of this embodiment obtains detailed data of meteorological field information only concerning the target zone, and thus, it is not necessary to conduct analysis for all the zones A2 through A15 by using CFD models. Accordingly, a lot of computation times taken by conducting analysis using CFD models are not necessary, and CFD analysis is conducted only for the target zone, thereby improving the precision and decreasing the processing time.

Reference numeral 320 shown in FIG. 6 designates a recirculating flow of exhaust gas. By conducting CFD analysis, the flow in which heated air discharged from the air utilizing apparatus is returned to and recirculates in the suction unit of the air utilizing apparatus can be calculated and clarified, which has not been clarified by conducting weather simulations. By the use of the recirculating flow, it can be determined which degree of temperature margin is to be taken for temperature data, which will be discussed later. Additionally, the recirculating flow is clarified, and thus, a suitable location of the air utilizing apparatus can be determined.

Moreover, for example, if required observation data, such as temperature data and wind direction data, is available since there is, for example, an aerodrome in A3 shown in FIG. 5, first narrow-area weather information sets may be recalculated by using such data as input values. With this arrangement, it is possible to improve the precision of weather simulations by using available local data.

Topographical features of the zone A16 in which the air utilizing apparatus is placed may be different from those described in weather information due to a reason of one of land leveling, land use, or equipment installation. Even in such a case, first narrow-area weather information sets may be recalculated on the basis of topographical information reflecting a result of associated one of the land leveling, land use, and equipment installation caused by placing the air utilizing apparatus. With this arrangement, it is possible to precisely simulate weather conditions after the air utilizing apparatus is placed.

6. Temperature Cumulative Frequency Distribution Around Air Utilizing Apparatus

Figure 7A:
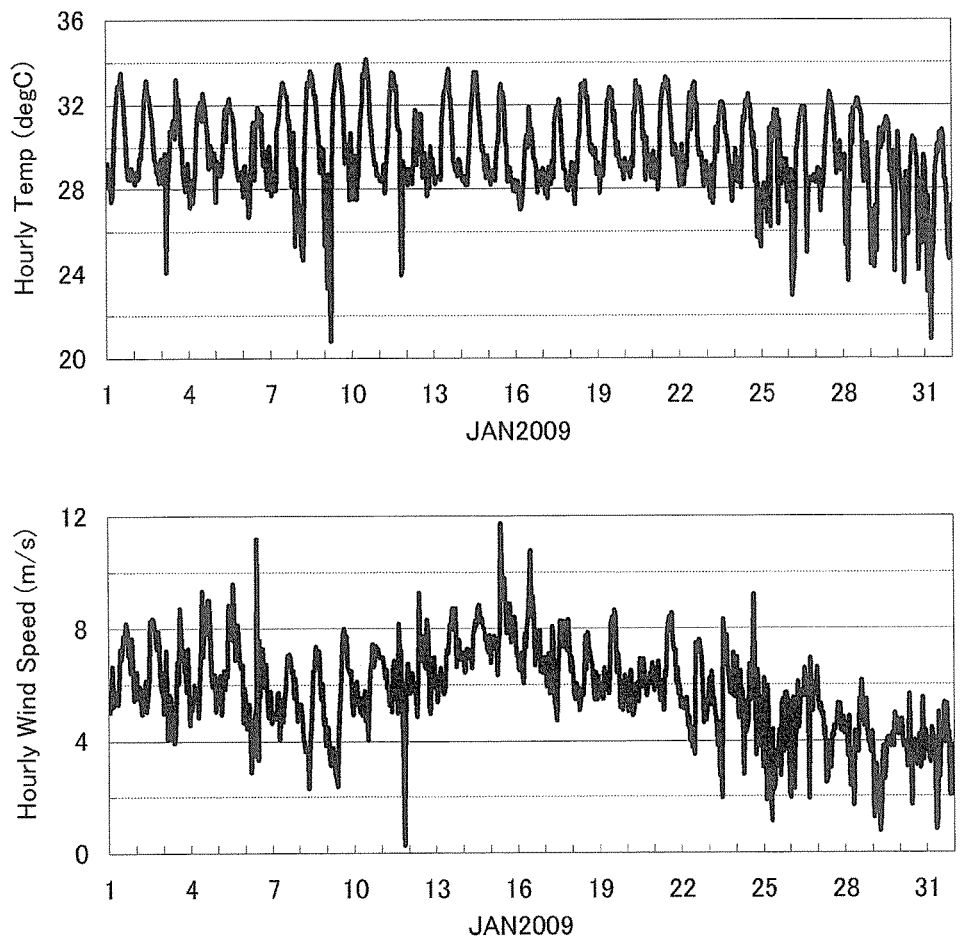
FIG. 7A illustrates an example of temperature data and an example of wind speed data obtained from narrow-area weather information.
Figure 7:
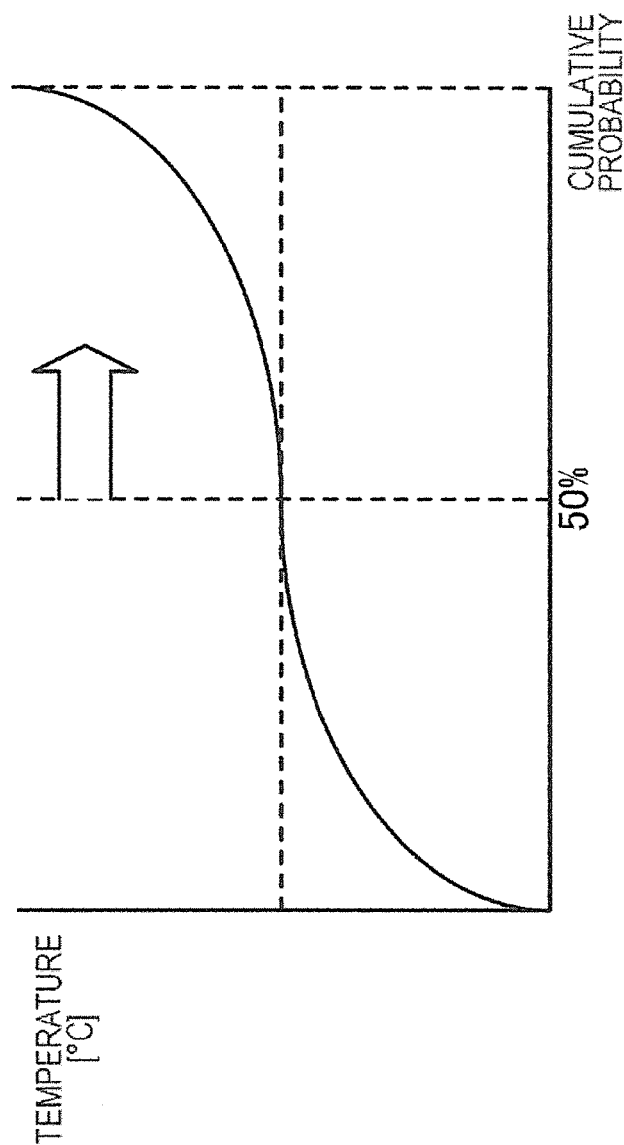
FIG. 7B illustrates a temperature cumulative frequency distribution obtained from temperature data of narrow-area weather information.
FIG. 7C illustrates a temperature exceedance probability distribution obtained from temperature data of narrow-area weather information.

FIG. 7A illustrates an example of temperature data and an example of wind speed data obtained from narrow-area weather information. The narrow-area weather information is information which has been obtained, for example, over the three years, and data in the year of 2009 is shown as an example in FIG. 7A.

If an air utilizing apparatus is a liquefaction plant, it has a large refrigeration system. In this case, the performance of the liquefaction plant when a refrigerant circulating within the refrigeration system is compressed and then liquefied in an air fin cooler significantly varies depending on the outside air temperature. For example, if the outside air temperature rises, the pressure at which the refrigerant is liquefied is increased. If the outside air temperature falls, the pressure at which the refrigerant is liquefied is decreased. Accordingly, the processing capacity of the liquefaction plant significantly varies depending on the outside air temperature.

The outside air temperature is different depending on whether it is during the day or the night, or whether it is in summer or in winter. Accordingly, the production amount of the liquefaction plant is calculated at various temperatures. In actuality, however, the design conditions for the liquefaction plant are restricted. If the outside air temperature is selected in a case in which gas composed of light components is utilized and the outside temperature is high (for example, the cumulative frequency is 99%), a desired amount of liquefied gas can be manufactured under any environmental temperature. On the other hand, however, the investment cost for the plant is high. If the outside air temperature is selected in a case in which gas composed of heavy components is utilized and the outside temperature is low (for example, the cumulative frequency is 1%), the results opposite to those of the first case are obtained. Accordingly, it is not possible to adopt the second case in terms of the performance reliability. Thus, an average gas composition which is neither heavy nor light is utilized, and the design temperature is decided as follows.

Figure 7C:
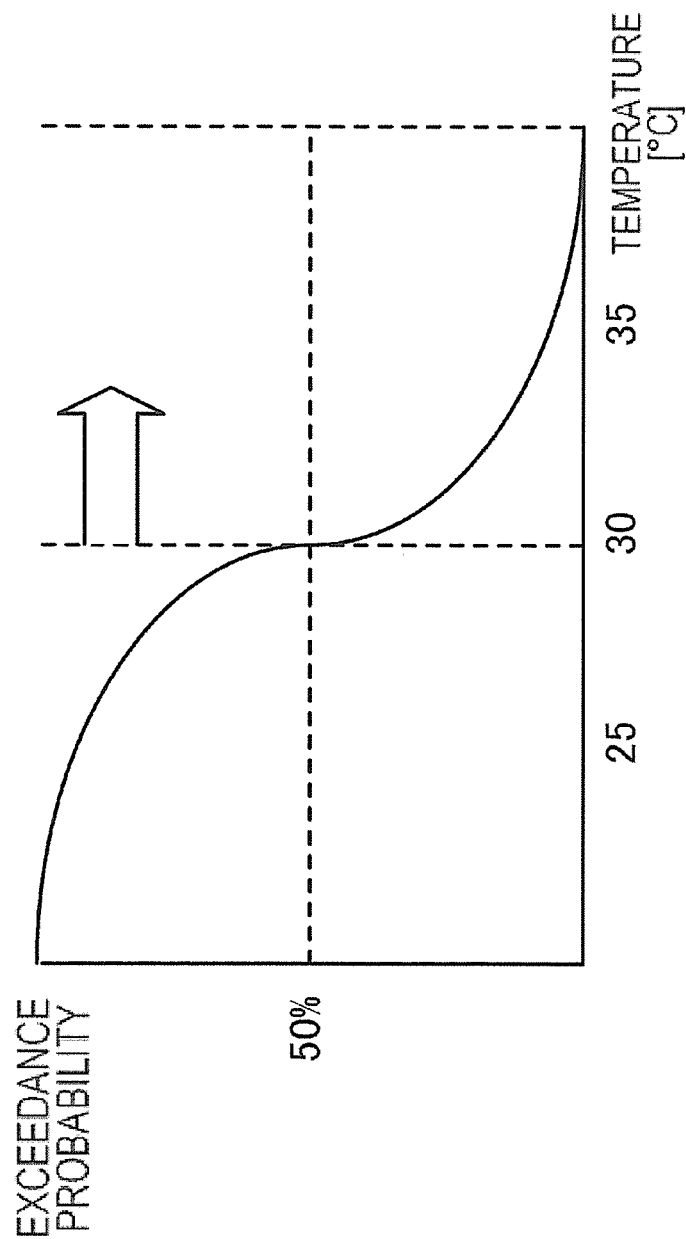

FIG. 7B illustrates a temperature cumulative frequency distribution obtained from temperature data of narrow-area weather information. FIG. 7C illustrates a temperature exceedance probability distribution obtained from temperature data of narrow-area weather information. The processor 12 generates such items of data, and outputs the generated items of data on the display section 16.

Further, the processor 12 calculates the design temperature according to one of a step of calculating the temperature at which the cumulative frequency exceeds at least 50% from the temperature cumulative frequency distribution, a step of calculating the temperature at which the exceedance probability is smaller than at least 50% from the temperature exceedance probability distribution, and a step of calculating the temperature obtained by adding a temperature margin (for example, 2° C.) to the temperature at which the cumulative frequency exceeds 50% or to the temperature at which the exceedance probability is smaller than 50%. The temperature calculated in this manner is set to be the design temperature for designing the air utilizing apparatus 100.

If the air utilizing apparatus 100 designed under the design temperature obtained in this manner is, for example, a liquefaction plant, it is able to manufacture a desired amount of liquefied gas and also to reduce the investment cost of the plant without failing to achieve the performance.

Figure 8:
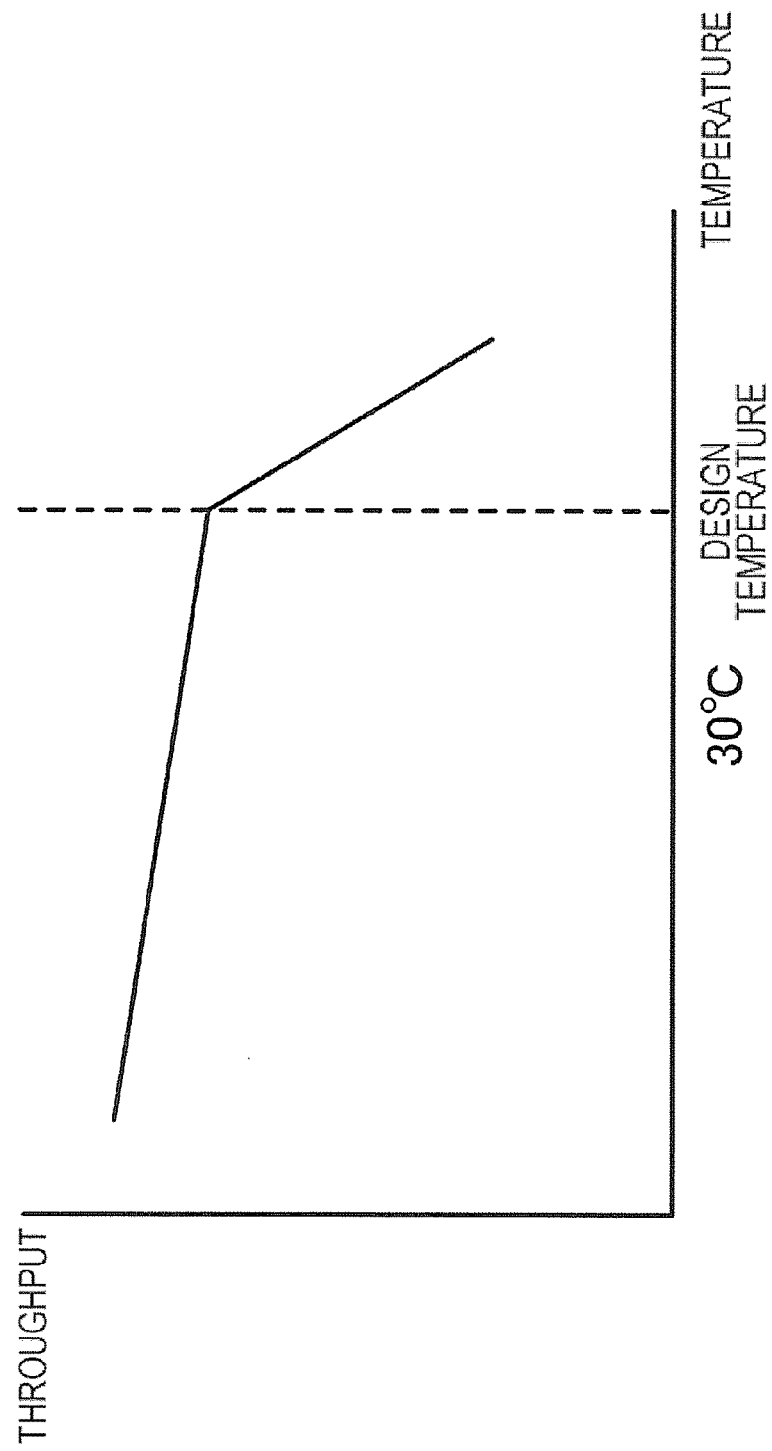
FIG. 8A illustrates an example of the relationship between the amount of liquefied hydrocarbon gas and the design temperature.

7. Relationship Between Design Temperature and Manufacturing Amount in Liquefaction Plants FIG. 8A illustrates an example of the relationship between the amount of liquefied hydrocarbon gas and the design temperature. When the outside air temperature is raised to the design temperature or higher, the performance of the air utilizing apparatus 100 is likely to be significantly decreased. For example, if, in the example in FIG. 3, the air fin cooler 100A is designed under the design temperature shown in FIG. 8A, when the outside air temperature exceeds the design temperature, the manufacturing amount of liquefied hydrocarbon gas sharply drops, thereby failing to satisfy a predetermined level of performance. In the weather predicting apparatus according to this embodiment, actual temperatures are precisely simulated. Thus, even if the air utilizing apparatus 100 is designed in an environment without measured data, the design temperature can be obtained by predicting the outside air temperature, thereby making it possible to design an air utilizing apparatus exhibiting a desired level of performance.

8. Wind Rose Around Air Utilizing Apparatus

Figure 9:
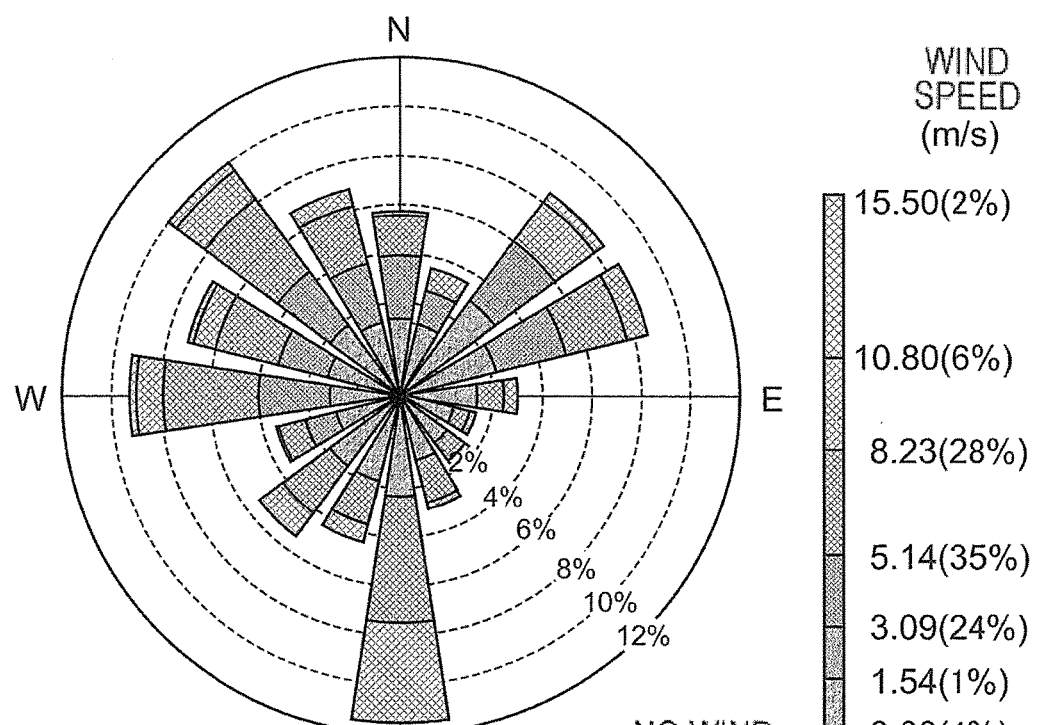
FIG. 9 is a wind rose obtained from wind direction data of narrow-area weather information.
Figure 9:
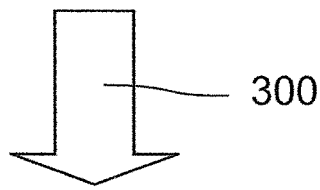
Figure 9:
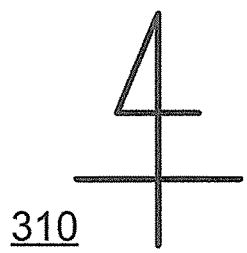

FIG. 9 is a wind rose obtained from wind direction data of narrow-area weather information. A wind rose is a diagram illustrating the frequencies of wind directions and wind speeds in certain directions at a certain location over a certain period. The cumulative frequency is higher as the wind direction data extends further in the radial direction. The wind speeds are also indicated by mesh patterns. The wind direction having the highest cumulative frequency obtained in this case is called a prevailing wind direction. In FIG. 9, the prevailing wind direction is denoted by 300. A cardinal direction symbol 310 corresponds to the prevailing wind direction 300. The drawings discussed below show that the south (S) in the cardinal direction symbol is the prevailing wind direction.

Figure 3:
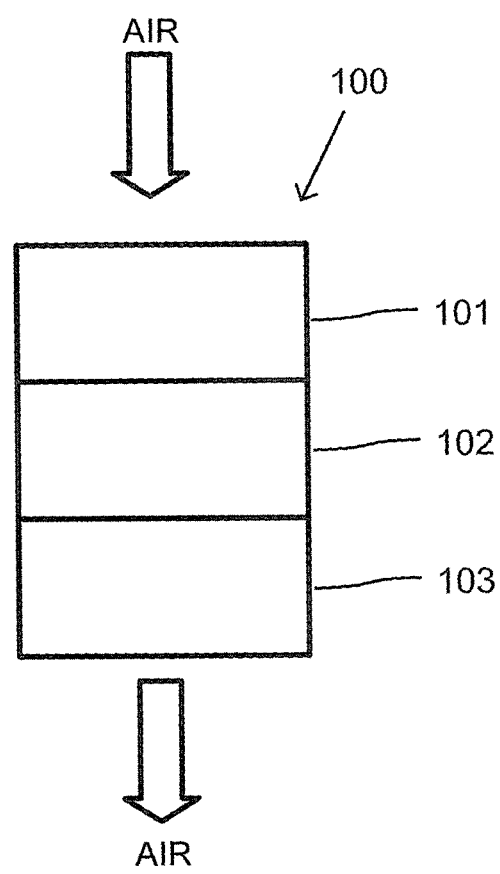
FIG. 3A illustrates an example of an air utilizing apparatus.
FIG. 3B illustrates a specific example of the air utilizing apparatus.
FIG. 3C illustrates another specific example of the air utilizing apparatus.
Figure 3:
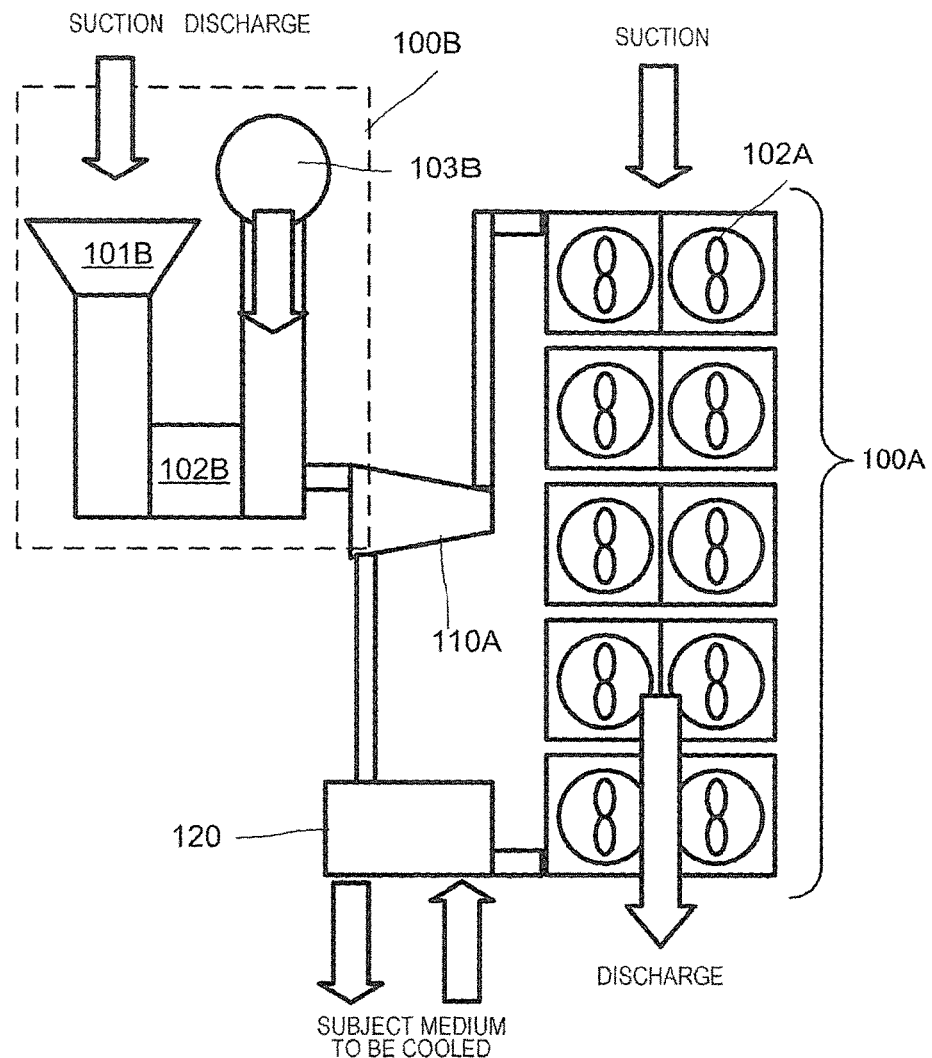
Figure 3:
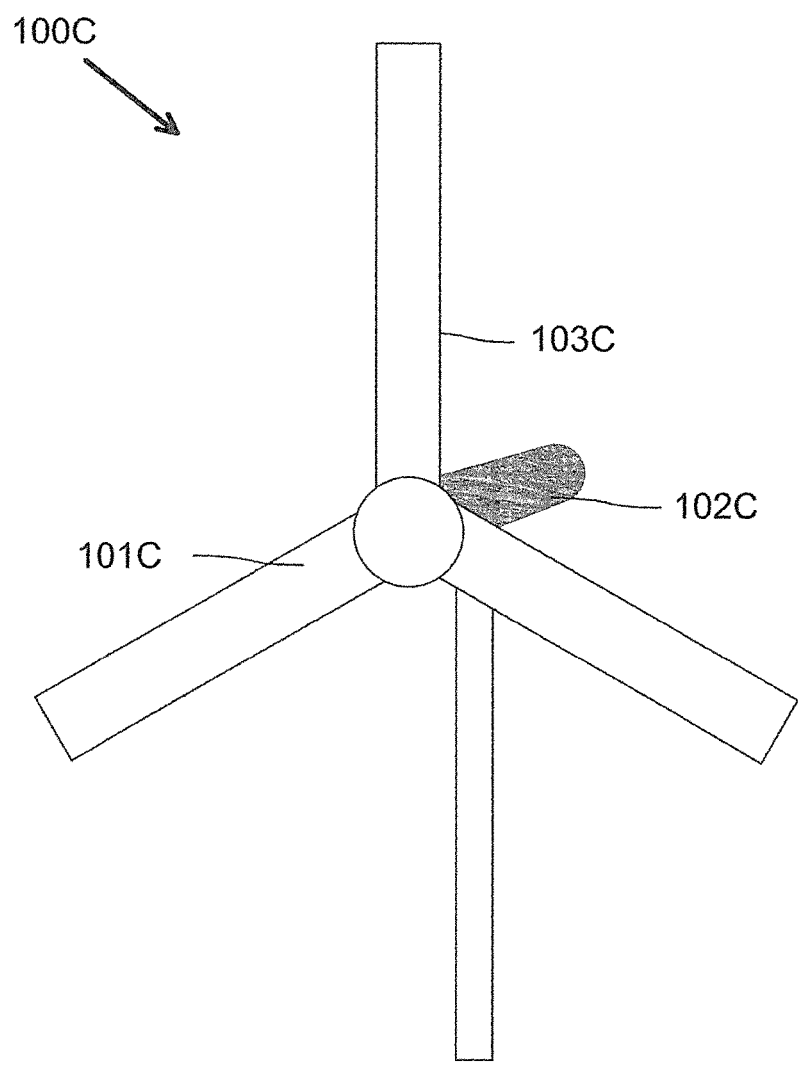

The air utilizing apparatus shown in FIG. 3 is generated on the basis of the design temperature or the prevailing wind direction generated described above.

Figure 10:
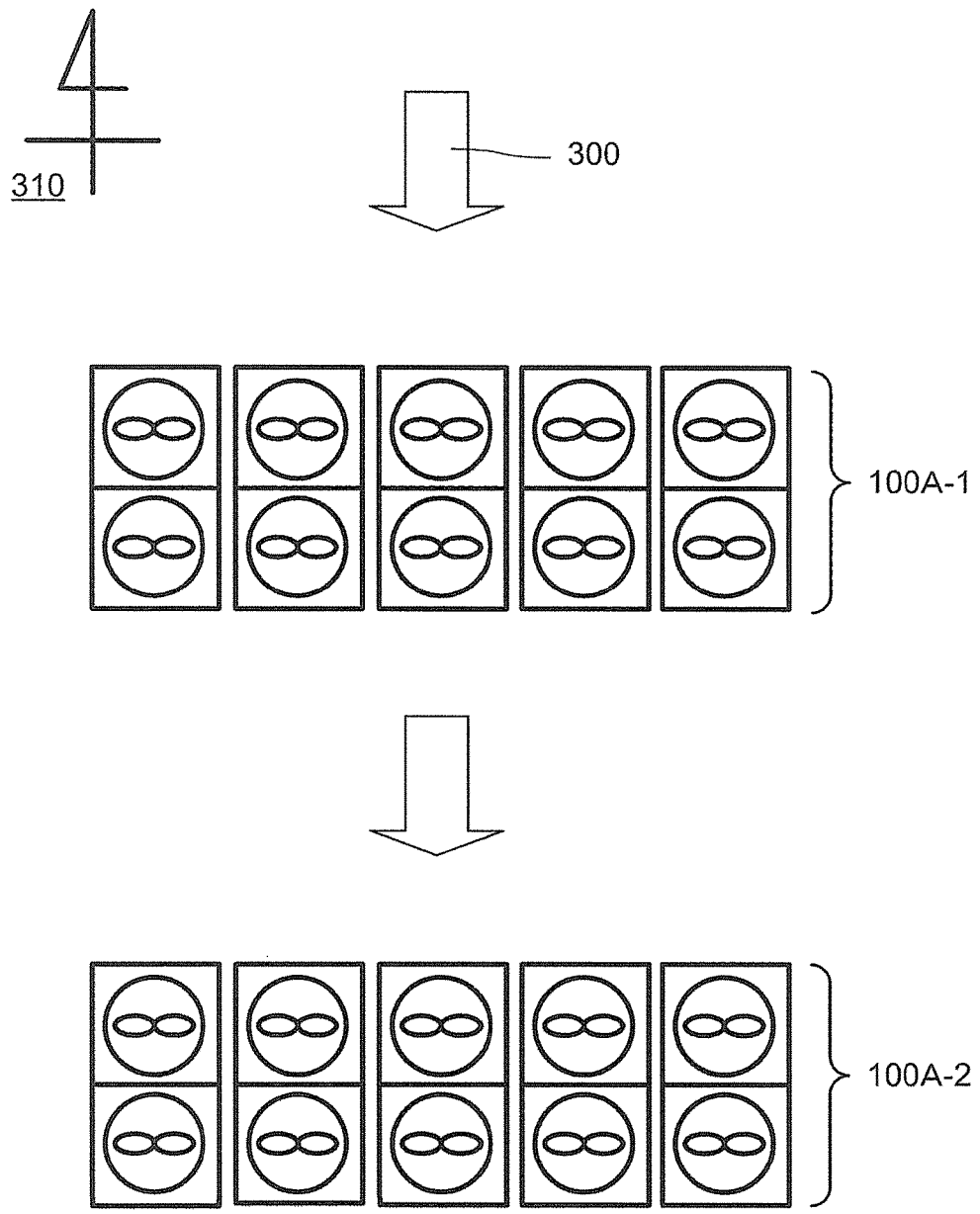
FIG. 10A illustrates the relationship between the prevailing wind direction and air fin coolers.
FIG. 10B illustrates the relationship between the prevailing wind direction and air fin coolers.

9. Layout in which Air Utilizing Apparatus is Arranged and Air Utilizing Apparatus on the Basis of the Layout FIGS. 10A and 10B illustrate the relationship between the prevailing wind direction and air fin coolers. Air fin coolers 100A-1 and 100A-2 shown in FIG. 10A are arranged with respect to the prevailing wind direction 300 such that gas discharged from a discharge unit of the air fin cooler 100A-1 located on the windward side will be sucked by a suction unit of the air fin cooler 100A-2 located on the leeward side. If the air fin coolers 100A-1 and 100A-2 are arranged in this manner, the air fin cooler 100A-2 utilizes heated discharged gas as a coolant gas, and thus, it is unable to perform desired heat exchange, thereby failing to satisfy a predetermined level of performance, as shown in FIG. 8A.

Accordingly, an air fin cooler is not arranged on the leeward side in the wind direction having the highest cumulative frequency in the generated wind rose, which would otherwise cause the air fin cooler to suck exhausted gas. As a result, the above-described inconvenience can be avoided. That is, on the basis of the calculated wind direction, air fin coolers are arranged in a layout such that gas discharged from a discharge unit located on the windward side will not be sucked by a suction unit located on the leeward side.

The air fin coolers 100A-1 and 100A-2 shown in FIG. 10B are arranged with respect to the prevailing wind direction 300 such that gas discharged from the discharge unit of the air fin cooler 100A-1 located on the windward side will not be sucked by the suction unit of the air fin cooler 100A-2 located on the leeward side. If the air fin coolers 100A-1 and 100A-2 are arranged in this manner, the air fin cooler 100A-2 can satisfy a predetermined level of performance. After calculating the prevailing wind direction, the processor 14 generates and outputs layout data 400A indicating that the air fin coolers 100A-1 and 100A-2 are arranged with respect to the prevailing wind direction 300 such that gas discharged from the discharge unit of the air fin cooler 100A-1 will not be sucked by the suction unit of the air fin cooler 100A-2 located on the leeward side.

Figure 11:
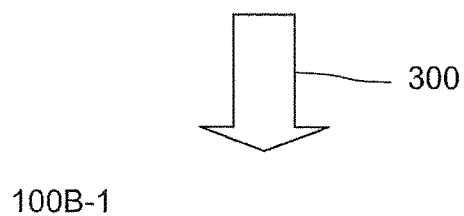
FIG. 11A illustrates the relationship between the prevailing wind direction and gas turbines.
FIG. 11B illustrates the relationship between the prevailing wind direction and gas turbines.
Figure 11:
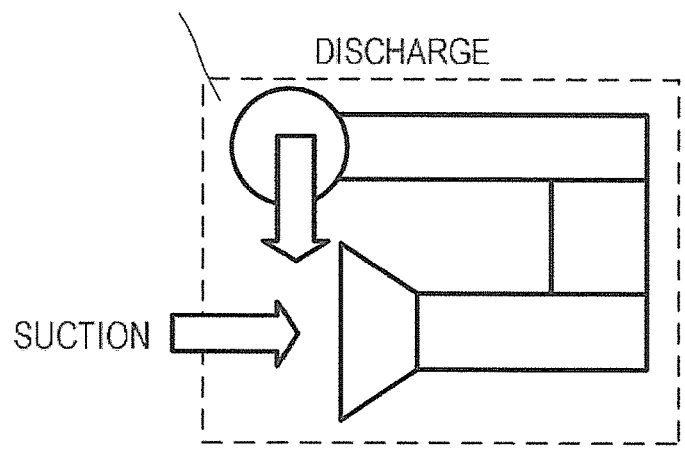
Figure 11:
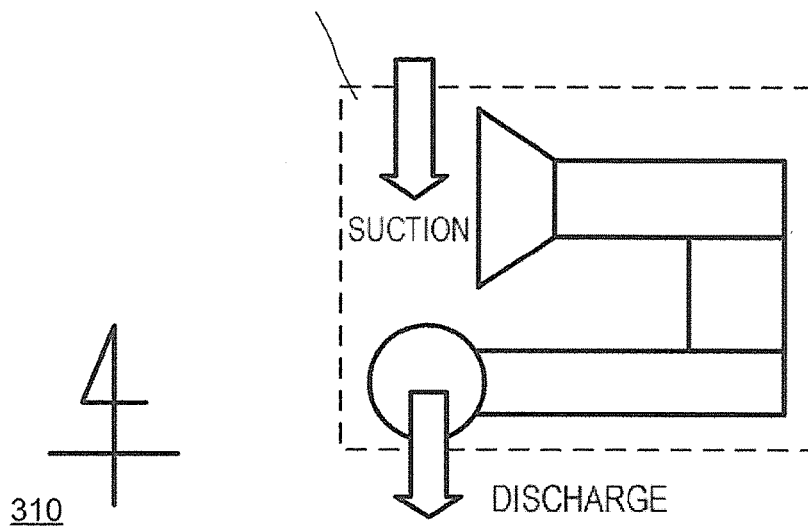
Figure 11B:
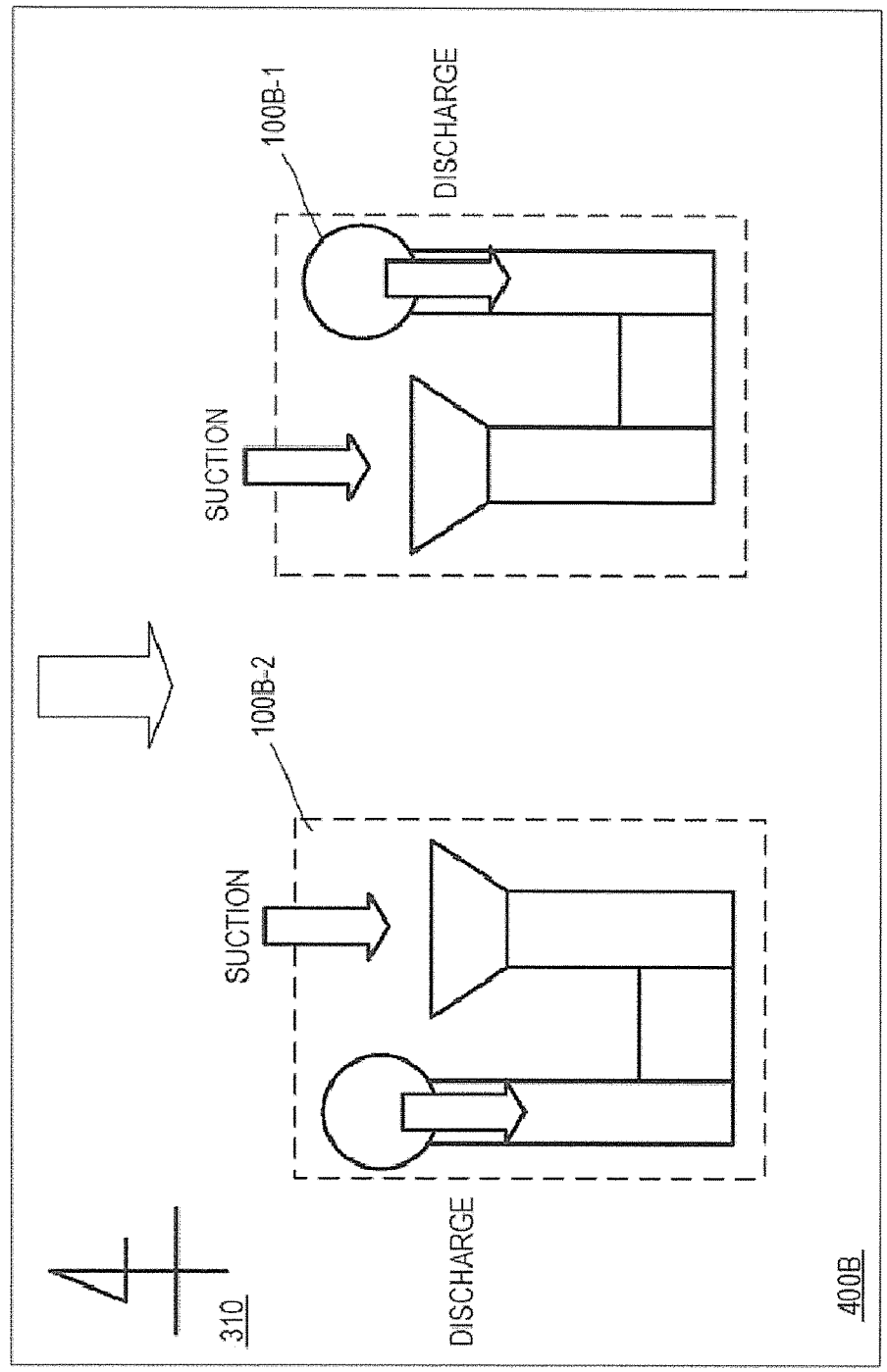

FIGS. 11A and 11B illustrate the relationship between the prevailing wind direction and gas turbines. Gas turbines 100B-1 and 100B-2 shown in FIG. 11A are arranged with respect to the prevailing wind direction 300 such that gas discharged from a discharge unit of the gas turbine 100B-1 located on the windward side will be sucked by a suction unit of the gas turbine 100B-2 located on the leeward side. If the gas turbines 100B-1 and 100B-2 are arranged in this manner, the gas turbine 100B-2 is likely to utilize heated discharged gas as a suction gas, and thus, it is unable to obtain a desired output.

Accordingly, a gas turbine is not arranged on the leeward side in the wind direction having the highest cumulative frequency in the generated wind rose, which would otherwise cause the gas turbine to suck exhausted gas. As a result, the above-described inconvenience can be avoided. That is, on the basis of the calculated wind direction, gas turbines are arranged in a layout such that gas discharged from a discharge unit located on the windward side will not be sucked by a suction unit located on the leeward side.

The gas turbines 100B-1 and 100B-2 shown in FIG. 11B are arranged with respect to the prevailing wind direction 300 such that gas discharged from the discharge unit of the gas turbine 100B-1 located on the windward side will not be sucked by the suction unit of the gas turbine 100B-2 located on the leeward side. If the gas turbines 100B-1 and 100B-2 are arranged in this manner, the gas turbine 100B-2 can satisfy a predetermined level of performance. After calculating the prevailing wind direction, the processor 14 generates and outputs layout data 400B indicating that the gas turbines 100B-1 and 100B-2 are arranged such that gas discharged from the discharge unit of the gas turbine 100B-1 will not be sucked by the suction unit of the gas turbine 100B-2 located on the leeward side in the prevailing wind direction 300.

Figure 12:
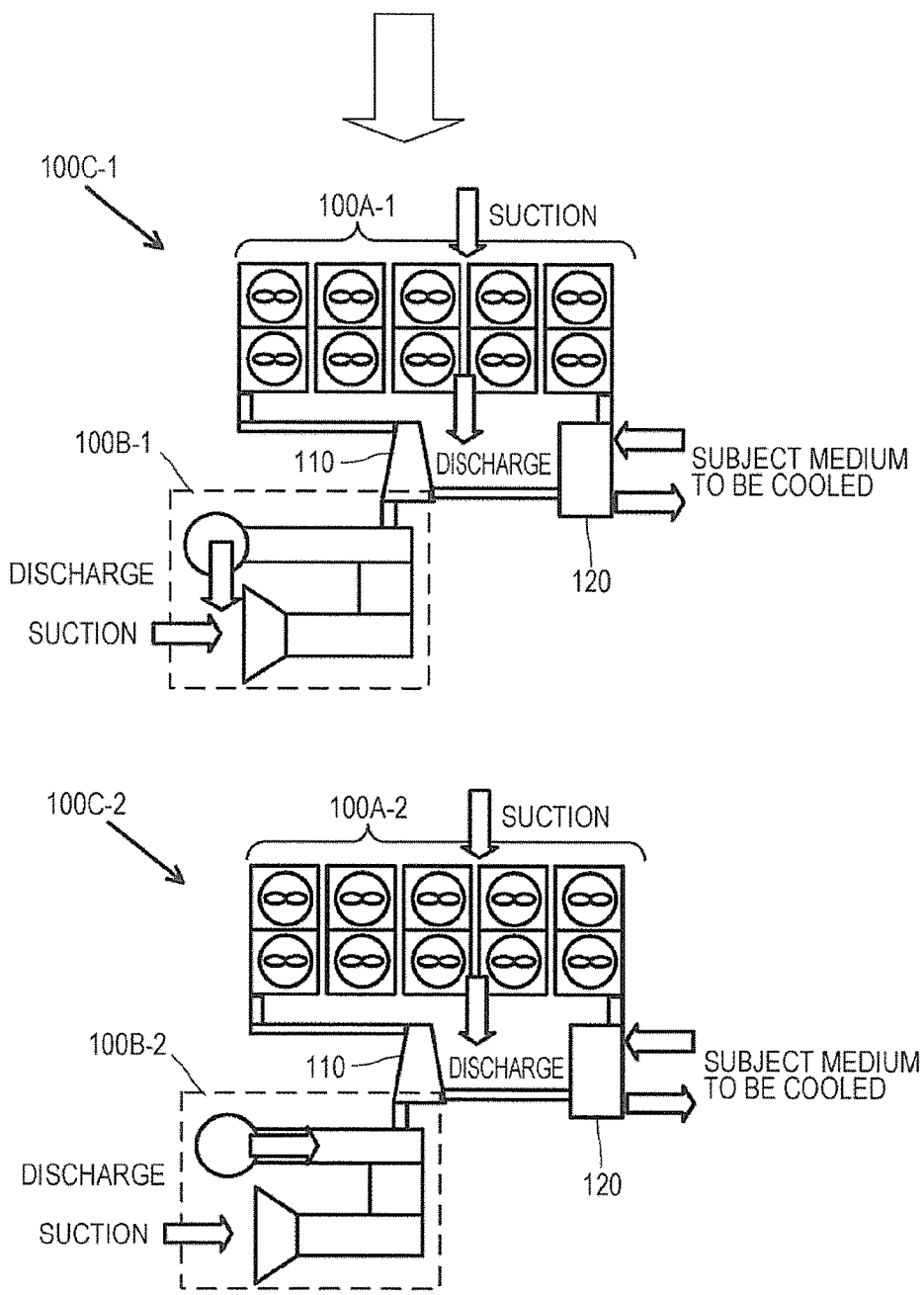
FIG. 12A illustrates the relationship between the prevailing wind direction and liquefaction plants.
FIG. 12B illustrates the relationship between the prevailing wind direction and liquefaction plants.
Figure 12:
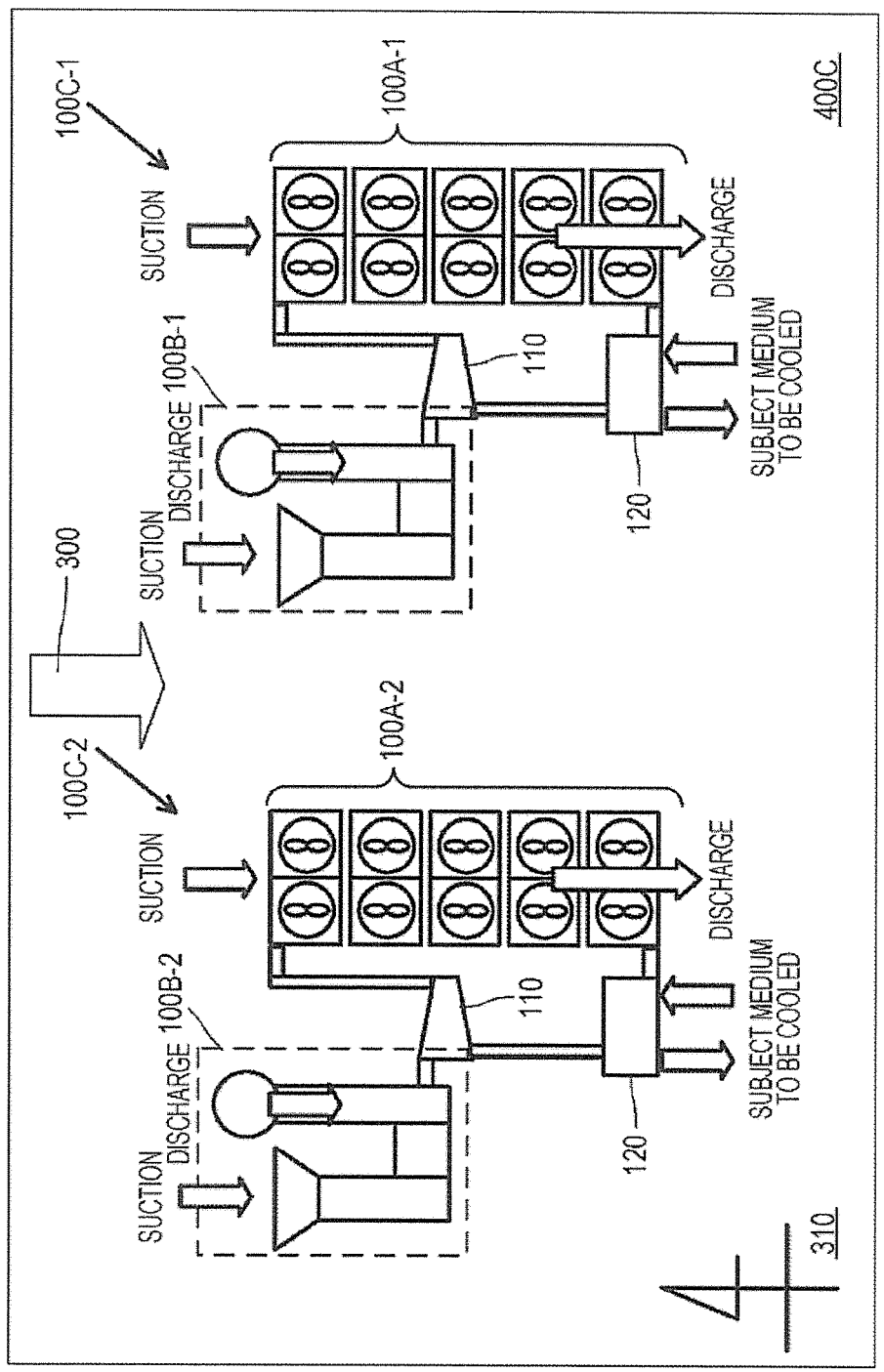

FIGS. 12A and 12B illustrate the relationship between the prevailing wind direction and liquefaction plants, each including a gas turbine and an air fin cooler. Liquefaction plants 100C-1 and 100C-2 shown in FIG. 12A are configured such that gas discharged from the air fin coolers 100A-1 and 100A-2 is sucked by the gas turbines 100B-1 and 100B-2, respectively. The liquefaction plants 100C-1 and 100C-2 shown in FIG. 12A are also configured with respect to the prevailing wind direction 300 such that gas discharged from a discharge unit of the liquefaction plant 100C-1 located on the windward side in the prevailing wind direction 300 is sucked by a suction unit of the liquefaction plant 100C-1 located on the leeward side in the prevailing wind direction 300. If the liquefaction plants 100C-1 and 100C-2 are arranged in this manner, the liquefaction plant 100C-1 is likely to utilize heated discharged gas as a suction gas, and thus, it is unable to obtain a desired level of performance.

Accordingly, a liquefaction plant is not arranged on the leeward side in the wind direction having the highest cumulative frequency in the generated wind rose, which would otherwise cause the liquefaction plant to suck exhausted gas. As a result, the above-described inconvenience can be avoided. That is, on the basis of the calculated wind direction, liquefaction plants are arranged in a layout such that gas discharged from a discharge unit located on the windward side will not be sucked by a suction unit located on the leeward side.

The liquefaction plants 100C-1 and 100C-2 shown in FIG. 12B are arranged with respect to the prevailing wind direction 300 such that gas discharged from the discharge unit of the liquefaction plant 100C-1 located on the windward side will not be sucked by the suction unit of the liquefaction plant 100C-2 located on the leeward side. If the liquefaction plants 100C-1 and 100C-2 are arranged in this manner, the liquefaction plants 100C-2 can satisfy a predetermined level of performance. After calculating the prevailing wind direction, the processor 14 generates and outputs layout data 400C indicating that the liquefaction plants 100C-1 and 100C-2 are arranged such that gas discharged from the discharge unit of the gas turbine 100B-1 located on the windward side will not be sucked by the suction unit of the liquefaction plant 100C-2 located on the leeward side.

On the basis of items of the layout data 400A, 400B, 400C, air fin coolers, gas turbines, and liquefaction plants, respectively, are manufactured or built. Then, the air utilizing apparatus of this embodiment can satisfy a desired level of performance.

10. Flowchart of Temperature Analysis and Design

Figure 13:
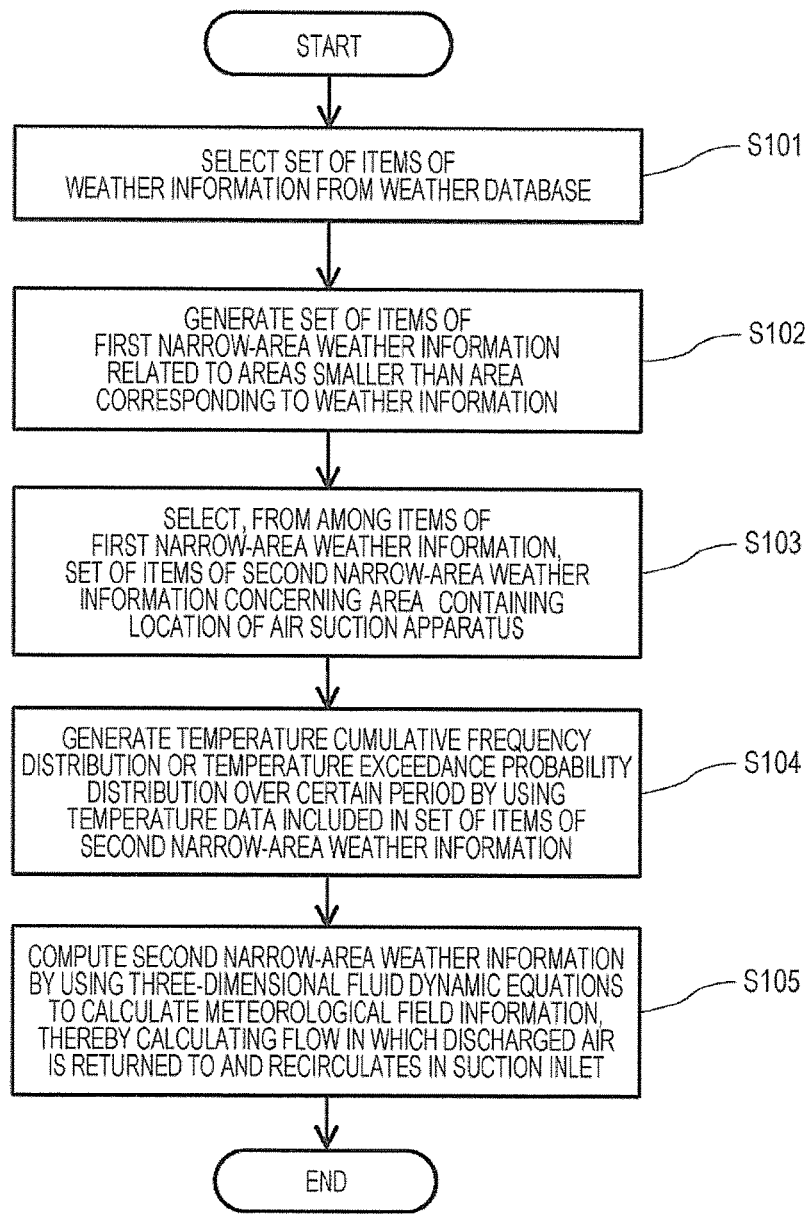
FIG. 13 illustrates an example of a flowchart of temperature analysis and design.

FIG. 13 illustrates an example of a flowchart of temperature analysis and design. The processor 14 of the weather predicting apparatus 90 executes the weather analysis program to perform the following processing. The processor 14 selects, from a weather database including a plurality of items of weather information having at least temperature data and related to times and areas, weather information sets related to an area containing a location at which an air utilizing apparatus is placed and a plurality of times over a certain period (S101).

The processor 14 of the weather predicting apparatus 90 executes the weather analysis program to perform the following processing. By solving differential equations expressing weather information based on weather analysis models by using each of the weather information sets as input data, first narrow-area weather information sets related to areas smaller than the area corresponding to the above-described weather information are generated (S102).

The processor 14 of the weather predicting apparatus 90 executes the weather analysis program to perform processing for selecting, from among the first narrow-area weather information sets, a second narrow-area weather information set concerning an area containing the location of the air utilizing apparatus (S103). The processor 14 executes the design temperature calculating program to perform the following processing. In order to calculate the design temperature of the air utilizing apparatus, the processor 14 generates a temperature cumulative frequency distribution or a temperature exceedance probability distribution over a certain period by using temperature data included in the second narrow-area weather information set (S104).

In the generation processing (S104), the design temperature may be calculated by one of a step of calculating, from meteorological field information, the temperature at which the cumulative frequency exceeds at least 50%, a step of calculating, from meteorological field information, the temperature at which the exceedance probability is smaller than at least 50%, and a step of adding a temperature margin to the temperature at which the cumulative frequency exceeds 50% or the temperature at which the exceedance probability is smaller than 50%.

The processor 14 of the weather predicting apparatus 90 executes the computational fluid analysis program to perform the following processing. The processor 14 computes the second narrow-area weather information by using three-dimensional fluid dynamic equations so as to calculate meteorological field information. Then, the processor 14 calculates a flow in which heated air discharged from the air utilizing apparatus is returned to and recirculates in the suction unit of the air utilizing apparatus (S105). Thus, on the basis of the recirculating flow, the temperature margin for the temperature obtained by the weather simulations can be determined.

11. Flowchart of Wind-Direction Analysis and Design

Figure 14:
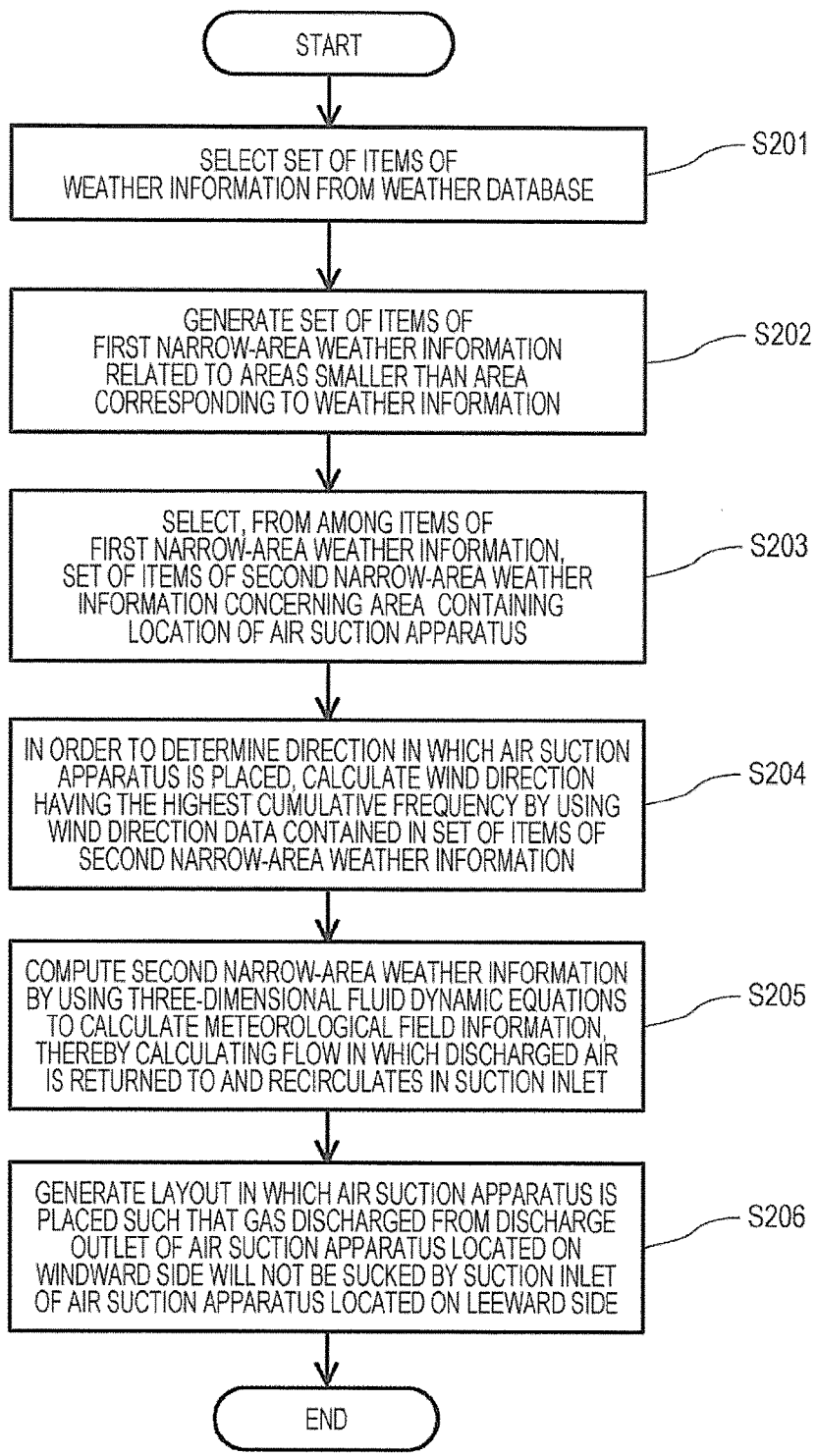
FIG. 14 illustrates an example of a flowchart of wind-direction analysis and design.

FIG. 14 is a flowchart of temperature analysis and design. Steps S201 through S203 shown in FIG. 14 respectively correspond to steps S101 through S103 of FIG. 13. The processor 14 of the weather predicting apparatus 90 executes the wind-rose generating program to perform the following processing. In order to determine the direction in which the air utilizing apparatus is placed, the processor 14 calculates a wind direction having the highest cumulative frequency by using wind direction data contained in the second narrow-area weather information set (S204). Further, the processor 14 of the weather predicting apparatus 90 executes the layout output program to perform the following processing. The processor 14 generates, on the basis of the calculated wind direction, a layout in which an air utilizing apparatus is arranged in the above-described area such that gas discharged from a discharge/exhaust unit of the air utilizing apparatus located on the windward side will not be sucked by a suction unit of the air utilizing apparatus located on the leeward side.

After step (S204), the processor 14 executes the computational fluid analysis program to perform the following processing. The processor 14 computes the second narrow-area weather information by using three-dimensional fluid dynamic equations so as to calculate meteorological field information concerning an area smaller than the areas corresponding to the second narrow-area weather information. Then, the processor 14 calculates, by using the meteorological field information, a flow in which heated air discharged from the air utilizing apparatus is returned to and recirculates in the suction unit of the air utilizing apparatus (S205). Thus, on the basis of the recirculating flow, the optimal arrangement of the air utilizing apparatus can be determined.

The above-described embodiment has been provided only as a typical illustration. Obviously, combinations of components of the embodiment, modifications and variations will be apparent to practitioners skilled in the art. It is also apparent that practitioners skilled in the art are able to make various modifications of the above-described embodiment without departing from the principle of the invention and the scope of the claims.

The invention claimed is:

1. A weather predicting method for predicting the weather by conducting weather simulations in order to design an air utilizing apparatus which is placed outdoors under the influence of surrounding weather conditions and which utilizes air as one of a heating energy source and a reactant, the weather predicting method comprising:

selecting, from a plurality of items of weather information which are related to areas and times and which include at least temperature data, a plurality of weather information sets related to a plurality of times over a fixed period concerning a first area containing a location at which the air utilizing apparatus is placed;

by solving, with the use of the selected plurality of weather information sets as input data, differential equations expressing the weather information based on analysis models used for conducting weather simulations, generating a plurality of first narrow-area weather information sets related to a plurality of second areas which are disposed within the first area and which are smaller than the first area;

selecting a second narrow-area weather information set concerning a second area containing the location of the air utilizing apparatus from among the generated plurality of first narrow-area weather information sets;

generating a temperature cumulative frequency distribution or a temperature exceedance probability distribution during the fixed period by using temperature data contained in the second narrow-area weather information set in order to calculate a design temperature of the air utilizing apparatus;

calculating meteorological field information concerning an area smaller than the second area corresponding to the second area corresponding to the second narrow-area weather information by computing the second narrow-area weather information by using three-dimensional fluid dynamic equations; and calculating, by using the meteorological field information, a flow in which heated air discharged from the air utilizing apparatus is returned to and recirculates in a suction unit of the air utilizing apparatus.

2. The weather predicting method according to claim 1, further comprising:

outputting the temperature cumulative frequency distribution or the temperature exceedance probability distribution, wherein the temperature cumulative frequency distribution or the temperature exceedance probability distribution includes one of the following as the design temperature
(a) a temperature at which a cumulative frequency indicated by the temperature cumulative frequency distribution exceeds at least 50%,
(b) a temperature at which an exceedance probability indicated by the temperature exceedance probability distribution is smaller than at least 50%, and
(c) a temperature obtained by adding a temperature margin to the temperature at which the cumulative frequency exceeds 50% or the temperature at which the exceedance probability is smaller than 50%.

3. The weather predicting method according to claim 1, further comprising:
a step of deciding the temperature margin on the basis of the flow.

4. The weather predicting method according to claim 1, wherein
a step of generating the first narrow-area weather information sets further includes recalculating the first narrow-area weather information sets by using observation data indicating at least one of a wind direction, a wind speed, and a temperature in an area corresponding to the weather information.

5. The weather predicting method according to claim 1, wherein
the first narrow-area weather information and the second narrow-area weather information are three-dimensional data, and indicate at least one of a wind direction, a wind speed, turbulence energy, solar radiation, atmospheric pressure, precipitation, humidity, and temperature.

6. A weather predicting apparatus for predicting the weather by conducting weather simulations in order to design an air utilizing apparatus which is placed outdoors under the influence of surrounding weather conditions and which utilizes air as one of a heating energy source and a reactant, the weather predicting apparatus comprising:
a storage section that stores therein a plurality of items of weather information which are related to areas and times and which include at least temperature data; and
a processor that selects, from the plurality of items of weather information, a plurality of weather information sets related to a plurality of times over a fixed period concerning a first area containing a location at which the air utilizing apparatus is placed, that generates a plurality of first narrow-area weather information sets related to a plurality of second areas which are disposed within the first area and which are smaller than the first area, by solving, with the use of the selected plurality of weather information sets as input data, differential equations expressing the weather information based on analysis models used for conducting weather simulations, that selects a second narrow-area weather information set concerning a second area containing the location of the air utilizing apparatus from among the generated plurality of first narrow-area weather information sets, and that generates a temperature cumulative frequency distribution or a temperature exceedance probability distribution during the fixed period by using temperature data contained in the second narrow-area weather information set in order to calculate a design temperature of the air utilizing apparatus;
wherein the processor calculates meteorological field information concerning an area smaller than the second area corresponding to the second area corresponding to the second narrow-area weather information by computing the second narrow-area weather information by using three-dimensional fluid dynamic equations;
wherein the processor calculates, by using the meteorological field information, a flow in which heated air discharged from the air utilizing apparatus is returned to and recirculates in a suction unit of the air utilizing apparatus.

7. The weather predicting apparatus according to claim 6, wherein:
the temperature cumulative frequency distribution or the temperature exceedance probability distribution includes one of the following as the design temperature
(a) a temperature at which a cumulative frequency indicated by the temperature cumulative frequency distribution exceeds at least 50%,
(b) a temperature at which an exceedance probability indicated by the temperature exceedance probability distribution is smaller than at least 50%, and
(c) a temperature obtained by adding a temperature margin to the temperature at which the cumulative frequency exceeds 50% or the temperature at which the exceedance probability is smaller than 50%; and
the processor outputs the temperature cumulative frequency distribution or the temperature exceedance probability distribution.

8. The weather predicting apparatus according to claim 6, wherein
the processor decides the temperature margin on the basis of the flow.

9. The weather predicting apparatus according to claim 6, wherein
in a step of generating the first narrow-area weather information sets, the processor recalculates the first narrow-area weather information sets by using observation data indicating at least one of a wind direction, a wind speed, and a temperature in an area corresponding to the weather information.

10. The weather predicting apparatus according to claim 6, wherein
the first narrow-area weather information and the second narrow-area weather information are three-dimensional data, and indicate at least one of a wind direction, a wind speed, turbulence energy, solar radiation, atmospheric pressure, precipitation, humidity, and temperature.

11. An air utilizing apparatus which is placed outdoors under the influence of surrounding weather conditions and which utilizes air as one of a heating energy source and a reactant, the air utilizing apparatus comprising:
a suction unit that sucks the air;
an operation unit that performs one of heat exchange and reaction by using the air sucked by the suction unit; and
a discharge unit that discharges gas emitted through one of operations of heat exchange and reaction, wherein
from a plurality of items of weather information which are related to areas and times and which include at least temperature data, a plurality of weather information sets related to a plurality of times over a fixed period concerning a first area containing a location at which the air utilizing apparatus is placed are selected,
by solving, with the use of the selected plurality of weather information sets as input data, differential equations expressing the weather information based on analysis models used for conducting weather simulations, a plurality of first narrow-area weather information sets related to a plurality of second areas which are disposed within the first area and which are smaller than the first area are generated, a second narrow-area weather information set concerning a second area containing the location of the air utilizing apparatus is selected from among the generated plurality of first narrow-area weather information sets, a temperature cumulative frequency distribution or a temperature exceedance probability distribution during the fixed period is generated by using temperature data contained in the second narrow-area weather information set in order to calculate a design temperature of the air utilizing apparatus, and the air utilizing apparatus is designed on the basis of a design temperature selected from, (a) a temperature at which a cumulative frequency indicated by the temperature cumulative frequency distribution exceeds at least 50%, (b) a temperature at which an exceedance probability indicated by the temperature exceedance probability distribution is smaller than at least 50%, and (c) a temperature obtained by adding a temperature margin to the temperature at which the cumulative frequency exceeds 50% or the temperature at which the exceedance probability is smaller than 50%;

wherein the air utilizing apparatus is designed on the basis of a design temperature obtained by calculating, by using the meteorological field information, a flow in which heated air discharged from the air utilizing apparatus is returned to and recirculates in a suction unit of the air utilizing apparatus and by deciding the temperature margin on the basis of the flow.

12. The air utilizing apparatus according to claim 11, wherein the air utilizing apparatus is designed on the basis of a design temperature obtained by computing the second narrow-area weather information by using three-dimensional fluid dynamic equations and by calculating meteorological field information concerning an area smaller than the second area corresponding to the second area corresponding to the second narrow-area weather information.

13. The air utilizing apparatus according to claim 11, wherein in a step of generating the first narrow-area weather information sets, the first narrow-area weather information sets are recalculated by using observation data indicating at least one of a wind direction, a wind speed, and a temperature in an area corresponding to the weather information.

* * * * *